(12) United States Patent
Laflamme et al.

(10) Patent No.: US 10,159,624 B2
(45) Date of Patent: Dec. 25, 2018

(54) METHOD FOR FACILITATING CONTROL OF A BATHING UNIT SYSTEM AND CONTROL PANEL IMPLEMENTING SAME

(71) Applicant: GECKO ALLIANCE GROUP INC., Quebec (CA)

(72) Inventors: Benoit Laflamme, Quebec (CA); Christian Brochu, Quebec (CA)

(73) Assignee: GECKO ALLIANCE GROUP INC., Quebec (CA)

( * ) Notice: Subject to any disclaimer, the term of this patent is extended or adjusted under 35 U.S.C. 154(b) by 570 days.

(21) Appl. No.: 14/851,986

(22) Filed: Sep. 11, 2015

(65) Prior Publication Data

US 2017/0071821 A1  Mar. 16, 2017

(51) Int. Cl.
*A61H 33/00* (2006.01)
*G05B 15/02* (2006.01)
(Continued)

(52) U.S. Cl.
CPC ........... *A61H 33/005* (2013.01); *G05B 15/02* (2013.01); *H04L 67/12* (2013.01); *H04L 67/22* (2013.01);
(Continued)

(58) Field of Classification Search
None
See application file for complete search history.

(56) References Cited

U.S. PATENT DOCUMENTS 4,568,821 A   2/1986 Boe
5,361,215 A   11/1994 Tompkins et al.
(Continued)

FOREIGN PATENT DOCUMENTS

CA   2430862   11/2007
CA   2324598   5/2008
(Continued)

OTHER PUBLICATIONS

Official Action for U.S. Appl. No. 15/227,404, dated Nov. 7, 2017, 6 pages Restriction Requirement.
(Continued)

*Primary Examiner* — Hyun Nam
(74) *Attorney, Agent, or Firm* — Sheridan Ross P.C.

(57) ABSTRACT

A method and a control panel are described for facilitating the control of a bathing unit system so that the bathing unit system is caused to transition between operating in accordance with a first operational mode to operating in accordance with a second operational mode. A control signal is generated in response to a unitary user input event performed by a user at a control panel of the bathing unit system, the control signal conveying an ambiance activation command associated with a specific ambience setting, the generation of the control signal comprising selecting the specific ambience setting from a set of ambience settings stored in a memory device. The control signal is then transmitted from the control panel to the controller over a communication link where it is processed to cause the bathing unit system to transition from being in the rest mode to operating in accordance with the specific ambience setting. The method and a control panel may allow simplifying the control of the bathing unit system in order to achieve a desired total effect by allowing a user to cause the bathing unit to operate in accordance with an ambience setting by way of a unitary user input event performed at the control panel.

33 Claims, 8 Drawing Sheets

(51) Int. Cl.
*H04W 4/80* (2018.01)
*H04L 29/08* (2006.01)
*A61H 33/06* (2006.01)
*A61H 33/02* (2006.01)

(52) U.S. Cl.
CPC ........... *H04W 4/80* (2018.02); *A61H 33/0087* (2013.01); *A61H 33/0095* (2013.01); *A61H 33/06* (2013.01); *A61H 33/6042* (2013.01); *A61H 2033/0058* (2013.01); *A61H 2033/0075* (2013.01); *A61H 2033/0083* (2013.01); *A61H 2033/022* (2013.01); *A61H 2201/0207* (2013.01); *A61H 2201/5007* (2013.01); *A61H 2201/5043* (2013.01); *A61H 2201/5046* (2013.01); *A61H 2201/5048* (2013.01); *A61H 2201/5082* (2013.01); *A61H 2201/5092* (2013.01); *A61H 2201/5097* (2013.01)

(56) References Cited

U.S. PATENT DOCUMENTS

| | | | |
|---|---|---|---|
| 5,710,409 | A | 1/1998 | Schwarzbacker et al. |
| 5,930,852 | A | 8/1999 | Gravatt et al. |
| 6,166,729 | A | 12/2000 | Acosta et al. |
| 6,200,108 | B1 | 3/2001 | Caudill et al. |
| 6,355,913 | B1 | 3/2002 | Authier et al. |
| 6,476,363 | B1 | 11/2002 | Authier et al. |
| 6,488,408 | B1 | 12/2002 | Laflamme et al. |
| 6,714,977 | B1 | 3/2004 | Fowler et al. |
| 6,717,050 | B2 | 4/2004 | Laflamme et al. |
| 6,734,879 | B2 | 5/2004 | Hasha et al. |
| 6,744,223 | B2 | 6/2004 | Laflamme et al. |
| 6,754,321 | B1 | 6/2004 | Innes et al. |
| 6,775,374 | B2 | 8/2004 | Nishikawa |
| 6,782,309 | B2 | 8/2004 | Laflamme et al. |
| 6,813,575 | B2 | 11/2004 | Laflamme |
| 6,874,175 | B2 | 4/2005 | Laflamme et al. |
| 6,900,736 | B2 | 5/2005 | Crumb |
| 6,929,516 | B2 | 8/2005 | Brochu et al. |
| 6,942,354 | B2 | 9/2005 | Metayer et al. |
| 7,010,363 | B2 | 3/2006 | Donnelly et al. |
| 7,046,163 | B2 | 5/2006 | Macey |
| 7,112,768 | B2 | 9/2006 | Brochu et al. |
| 7,292,898 | B2 | 11/2007 | Clark et al. |
| 7,327,275 | B2 | 2/2008 | Brochu et al. |
| 7,398,138 | B2 | 7/2008 | Emery et al. |
| 7,419,406 | B2 | 9/2008 | Brochu et al. |
| 7,420,293 | B2 | 9/2008 | Donnelly et al. |
| 7,440,820 | B2 | 10/2008 | Gougerot et al. |
| 7,489,986 | B1 | 2/2009 | Laflamme et al. |
| 7,514,884 | B2 | 4/2009 | Potucek et al. |
| 7,593,789 | B2 | 9/2009 | Gougerot et al. |
| 7,619,181 | B2 | 11/2009 | Authier |
| 7,701,679 | B2 | 4/2010 | Brochu et al. |
| 7,843,357 | B2 | 11/2010 | Brochu et al. |
| 7,982,625 | B2 | 7/2011 | Brochu et al. |
| 8,104,110 | B2 | 1/2012 | Caudill et al. |
| 8,150,552 | B2 | 4/2012 | Brochu et al. |
| 8,164,470 | B2 | 4/2012 | Brochu et al. |
| 8,612,061 | B2 | 12/2013 | Laflamme et al. |
| 8,644,960 | B2 | 2/2014 | Laflamme et al. |
| 8,892,261 | B2 * | 11/2014 | Hoonhout .................. A61L 9/12 700/275 |
| 9,043,472 | B1 | 5/2015 | Chau |
| 9,442,639 | B2 | 9/2016 | Laflamme et al. |
| 2001/0029407 | A1 | 10/2001 | Tompkins et al. |
| 2002/0025050 | A1 | 2/2002 | Macey |
| 2003/0011634 | A1 | 1/2003 | Hasha et al. |
| 2003/0020742 | A1 | 1/2003 | Hasha et al. |
| 2003/0022635 | A1 | 1/2003 | Benning et al. |
| 2004/0054789 | A1 | 3/2004 | Breh et al. |
| 2004/0117330 | A1 | 6/2004 | Ehlers et al. |
| 2004/0119814 | A1 | 6/2004 | Clisham et al. |
| 2005/0015458 | A1 | 1/2005 | La |
| 2005/0088119 | A1 | 4/2005 | Potucek et al. |
| 2005/0288821 | A1 | 12/2005 | Laflamme et al. |
| 2006/0031476 | A1 | 2/2006 | Mathes et al. |
| 2006/0221841 | A1 | 10/2006 | Lee |
| 2008/0021685 | A1 | 1/2008 | Emery et al. |
| 2008/0039977 | A1 | 2/2008 | Clark et al. |
| 2008/0129578 | A1 | 6/2008 | Petersen et al. |
| 2008/0154394 | A1 | 6/2008 | Lin |
| 2008/0163416 | A1 | 7/2008 | Go |
| 2008/0168599 | A1 | 7/2008 | Caudill et al. |
| 2008/0205865 | A1 | 8/2008 | Lesage et al. |
| 2008/0259056 | A1 | 10/2008 | Freier et al. |
| 2008/0311898 | A1 | 12/2008 | Benco et al. |
| 2009/0013210 | A1 | 1/2009 | McIntosh et al. |
| 2009/0164049 | A1 | 6/2009 | Nibler et al. |
| 2009/0187499 | A1 | 7/2009 | Mulder et al. |
| 2009/0240766 | A1 | 9/2009 | Kikkawa et al. |
| 2010/0132106 | A1 | 6/2010 | Cline et al. |
| 2010/0138786 | A1 | 6/2010 | McQueen |
| 2010/0150170 | A1 | 6/2010 | Lee et al. |
| 2010/0168878 | A1 * | 7/2010 | Hoonhout .................. A61L 9/12 700/90 |
| 2010/0206869 | A1 | 8/2010 | Nelson et al. |
| 2010/0219962 | A1 | 9/2010 | Brochu et al. |
| 2011/0046805 | A1 | 2/2011 | Bedros et al. |
| 2011/0046806 | A1 | 2/2011 | Nagel et al. |
| 2011/0093099 | A1 | 4/2011 | Tran et al. |
| 2011/0098869 | A1 | 4/2011 | Seo et al. |
| 2011/0202150 | A1 | 8/2011 | Tran et al. |
| 2012/0055419 | A1 | 3/2012 | Beyerle et al. |
| 2012/0078426 | A1 | 3/2012 | Macey |
| 2012/0096637 | A1 | 4/2012 | Laflamme et al. |
| 2012/0173382 | A1 * | 7/2012 | Loveland ........... G06Q 30/0601 705/26.5 |
| 2013/0094444 | A1 | 4/2013 | Lai et al. |
| 2014/0108986 | A1 | 4/2014 | Laflamme et al. |
| 2015/0095402 | A1 * | 4/2015 | Fraccaroli ............... H04W 4/02 709/202 |
| 2016/0342323 | A1 | 11/2016 | Laflamme et al. |
| 2017/0203634 | A1 * | 7/2017 | Dickow ............... G08G 1/0967 |

FOREIGN PATENT DOCUMENTS

| | | |
|---|---|---|
| CA | 2483876 | 4/2009 |
| CA | 2349106 | 10/2009 |
| CA | 2442861 | 12/2009 |
| CA | 2521572 | 12/2009 |
| CA | 2361096 | 3/2011 |
| CA | 2467015 | 7/2011 |
| CA | 2730873 | 8/2011 |
| CA | 2492350 | 11/2011 |
| CA | 2357641 | 1/2012 |
| CA | 2412221 | 1/2012 |
| CA | 2755673 | 4/2012 |
| CA | 2499551 | 5/2012 |
| CA | 2755672 | 4/2016 |
| CA | 2934395 | 11/2017 |
| CA | 2904274 | 12/2017 |

OTHER PUBLICATIONS

Office Action dated Jan. 10, 2018 in connection with U.S. Appl. No. 15/227,404—19 pages.
Non-Final Non-Final Office Action dated Aug. 30, 2017 in connection with U.S. Appl. No. 14/852,792, 13 pages.
Examiner's Report dated Oct. 12, 2017 in connection with Canadian patent application No. 2,762,788, 5 pages.
Office Action dated Oct. 26, 2012 in connection with U.S. Appl. No. 12/910,615, 13 pages.
Office Action dated Mar. 22, 2013 in connection with U.S. Appl. No. 12/916,160, 16 pages.
Notice of Allowance dated Aug. 16, 2013 in connection with U.S. Appl. No. 13/916,160, 7 pages.
Restriction Requirement dated Sep. 30, 2013 in connection with U.S. Appl. No. 13/336,513, 4 pages.
Notice of Allowance dated Sep. 25, 2013 in connection with U.S. Appl. No. 12/910,615, 13 pages.

(56) References Cited

OTHER PUBLICATIONS

Office Action dated Nov. 7, 2013 in connection with U.S. Appl. No. 13/336,513, 8 pages.
Office Action dated Mar. 11, 2014 in connection with U.S. Appl. No. 14/0106,554, 11 pages.
Office Action dated Jun. 26, 2014 in connection with U.S. Appl. No. 13/336,513, 7 pages.
Restriction Requirement dated Nov. 4, 2014 in connection with U.S. Appl. No. 14/106,554, 5 pages.
Office Action dated Jan. 23, 2015 in connection with U.S. Appl. No. 13/336,513, 6 pages.
Examiner's Report dated Feb. 10, 2015 in connection with Canadian Patent Application 2, 755,672, 8 pages.
Ex parte Quayle Action issued on Apr. 22, 2015 in connection with U.S. Appl. No. 14/106,554, 4 pages.
Office Action dated Jul. 14, 2015 in connection with U.S. Appl. No. 13/336,513, 5 pages.
Newport Controls, LLC, "Azure Control Panel—User's Manual", Newport Controls User Manual downloaded from website on Sep. 27, 2010, 37 pages.
Notice of Allowance dated Sep. 17, 2015 in connection with Canadian Patent Application 2,755,672, 1 page.
Non-Final Office Action dated Nov. 4, 2015 in connection with U.S. Appl. No. 14/106,554, 11 pages.
Non-Final Office Action dated Dec. 14, 2015 in connection with U.S. Appl. No. 14/852,792, 8 pages.
Examiner's report dated May 10, 2016 in connection with Canadian Patent Application 2, 755,673, 2 pages.
Final Office Action dated May 5, 2016 in connection with U.S. Appl. No. 14/852,792, 6 pages.
Notice of Allowance dated May 6, 2016 in connection with U.S. Appl. No. 14/106,554, 5 pages.
Non-Final Office Action dated Dec. 2, 2016 in connection with related U.S. Appl. No. 14/852,792.
Examiner's Report dated Jan. 24, 2017 in connection with Canadian application No. 2,904,274—3 pages.
Examiner's Report dated Jan. 24, 2017 in connection with Canadian patent application 2,762,788—3 pages.
Final Office Action dated Mar. 27, 2017 in connection with U.S. Appl. No. 14/852,792.
Notice of Allowance dated Apr. 12, 2017 in connection with Canadian patent application 2,934,395—1 page.
Notice of Allowance dated Jun. 29, 2017 in connection with Canadian patent application 2,904,274—1 page.

\* cited by examiner

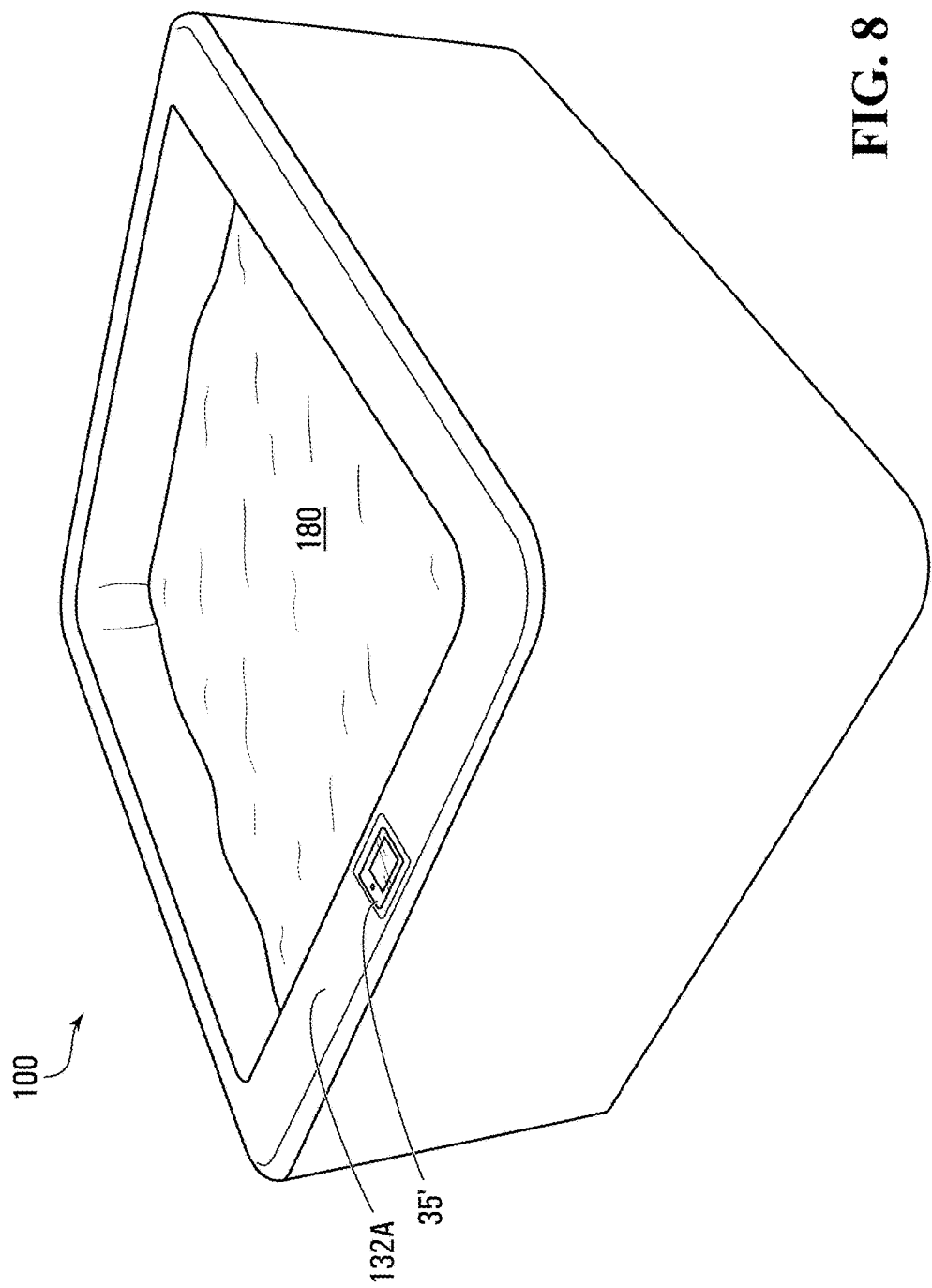

METHOD FOR FACILITATING CONTROL OF A BATHING UNIT SYSTEM AND CONTROL PANEL IMPLEMENTING SAME

FIELD OF THE INVENTION

The present invention relates generally to the field of bathing unit systems, and more specifically, to a method and control panel facilitating the control of operational settings in a bathing unit system to cause the bathing unit system to transition between operating in accordance with a first operational mode to operating in accordance with a second operational mode.

BACKGROUND

Bathing units, such as spas, typically include various bathing unit components that are used in operating the bathing unit system. The bathing unit components generally include pumps that circulate water through a piping system, pumps for activating water jets, at least one heating module to heat the water, a filter system, an air blower, an ozone generator, a lighting system, and a controller that activates and manages the various operational settings of the bathing unit components. Other types of bathing units that have similar components include, for instance, whirlpools, hot tubs, bathtubs, therapeutic baths, and swimming pools.

In addition to bathing unit components used for regulating the operation of the bathing unit system, additional features that provide added entertainment are increasingly being included as part of bathing unit systems. An example of such a feature includes lighting elements for providing visual stimulation to users of the bathing unit system. An example of a lighting element using multicolor LEDs was described in U.S. Pat. No. 6,744,223 entitled "Multicolor lamp system" issued on Jun. 1, 2004 to B. Laflamme et al. Other features include multimedia elements providing audio and/or video functionality. Examples of audio systems for spas have been described in U.S. patent publication no.: US 2002/0025050 A1, entitled "Spa Audio System Operable With A Remote Control" filed on May 24, 2001 by S. S. Macey; in U.S. patent publication no.: 2004/0047484 A1, entitled "Sound system, a speaker assembly, and a method for providing sound for a spa" filed on Sep. 5, 2003 by W. J. Gardenier et al. and U.S. patent publication no.: 2010/0070059 A1, entitled "Bathing unit control system providing multimedia functionality, telephone functionality and/or data network access functionality and bathing unit system including same" filed on Nov. 16, 2009 by B. Laflamme et al.

Most modern bathing unit control systems include a control panel that is in communication with the bathing unit controller. A user of the bathing unit system can use the control panel in order to adjust and control the activation and settings of the various bathing unit components. It is known in the art to have a user control interface that provides the user with a display screen and buttons for allowing a user to control the functionality of the various bathing unit components.

Traditionally, each operational parameter of a bathing unit is independently set by a user in order to achieve a desired total effect in the bathing unit system. For example, if the user wishes to achieve a relaxed ambiance in the bathing unit, he/she may select low lighting, spa jets at a medium speed, calming music at a low volume and to have the filtration system turned off to reduce the noise level. Each of the parameters is set independently by the user who must choose an operational setting for these parameters using the controls provided on a control interface. This can be a time-consuming and frustrating activity for the user.

A deficiency with controllers and user control panels of the type described above is that they do not provide suitable functionality for allowing the user of the bathing unit system to adjust and activate the desired operational settings for the bathing unit components in a relatively quick and convenient manner.

In order to alleviate this deficiency, various solutions have been proposed in which different sets of operational settings for different bathing unit components can be stored in a memory, each set corresponding to a respective desired total effect (or ambience) for the bathing unit system. In some solutions, a menu driven interface is provided, either at the control panel or via another computing device, through which a user can navigate and be presented with a set of selectable total effect (or ambience) options. Upon selection of one of the presented options, the bathing unit system is caused to apply corresponding operational settings to different bathing unit components in the system in order to achieve the corresponding desired total effect (or ambience). Some examples of solutions of this type are described in U.S. patent publication No. 20140108986 A1, the contents of which are incorporated herein by reference. While some of these solutions may simplify the control of the bathing unit system in order to achieve a desired total effect, options still need to be displayed to the user and/or the user is still required to navigate through a menu-driven interface and/or the user is required to make one or more selections in order for the desired total effect (or ambience) to be achieved in the bathing unit system.

Against the background described above, there is a need in the industry to provide a method and a control panel that further facilitates the control of the operational settings in bathing unit systems that alleviate at least in part the problems associated with existing methods and devices.

SUMMARY

In accordance with a first aspect, a method for causing a bathing unit system to transition from being in a rest mode to operating in accordance with an ambience setting is proposed. The bathing system includes a set of bathing unit components, a controller for operating the set of bathing unit components and a control panel in communication with the controller. The method comprises generating a control signal in response to a unitary user input event performed by a user at the control panel, the control signal conveying an ambiance activation command associated with a specific ambience setting, the generation of the control signal comprising selecting the specific ambience setting from a set of ambience settings stored in a memory device. The method further comprises transmitting the control signal conveying the ambiance activation command from the control panel to the controller over a communication link. The method further comprises, at the controller, processing the control signal conveying the ambiance activation command received from the control panel to cause the bathing unit system to transition from being in the rest mode to operating in accordance with the specific ambience setting.

Advantageously, the proposed method may allow simplifying the control of the bathing unit system in order to achieve a desired total effect by allowing a user to cause the bathing unit to operate in accordance with an ambience setting by way of a unitary user input event performed at the control panel.

In specific examples of implementation of the method, the control panel may include a display screen and the method may comprise causing the display screen to display information in response to the unitary user input event performed by the user at the control panel, the displayed information conveying the selected specific ambiance setting.

In some specific practical implementations of the method, the memory device may store one or more ambience settings including the specific ambience setting. The specific ambience setting may be characterized by at least a first operational setting for at least one bathing unit component of a first type and a second operational setting for at least one bathing unit component of a second type. In such implementations, the bathing unit system may be caused to transition from being in the rest mode to operating in accordance with the specific ambience setting at least in part by having the controller operate a corresponding one of the at least one bathing unit component of the first type according to the first operational setting and operate a corresponding one of the at least one bathing unit component of the second type according to the second operational setting.

In some specific practical implementations, the control panel may include a user operable actuator and the unitary user input event performed at the control panel may be an actuation of the user operable actuator by the user at the control panel. The nature of the user operable actuator, and therefore the nature of the type of actuation performed by the user at the control panel, may differ in different implementations. For example, the user operable actuator may be in the form of a tactile zone on a display, a mechanically operated actuator (such as a switch or a button for example), a light detection module, a movement detection module and/or any other suitable user operable actuator allowing a user to perform a unitary user input event. Depending on the nature of the user operable actuator, the unitary user input event may be manual, visual (for example light), auditory (noise) and (or) kinesthetic (movement) for example. In a specific non-limiting implementation, the user operable actuator is in the form of a tactile zone on the control panel providing haptic feedback in response to a user performing a touch or push-button like action. In another specific non-limiting implementation, the user operable actuator is in the form of a mechanically operated actuator and the unitary user input event is a manual actuation.

In some specific practical implementations in which the control panel includes a user operable actuator and in which the unitary user input event performed at the control panel is an actuation of the user operable actuator by the user at the control panel, the selection of the specific ambience setting from the set of ambience settings may be performed based on one or more criteria independent from information provided by the user through the actuation of the user operable actuator. For example, the selection of the specific ambience setting from the set of ambience settings may correspond:

(1) to an ambience setting in the set of ambience settings most recently used to operate the bathing unit system;
(2) to a default ambience setting, which may be predetermined and stored in the memory at the time the control panel is configured or may be programmed by a user at another time and stored on the memory.

Alternatively, or in combination with the above, the selection of the specific ambience setting from the set of ambience settings may be based on other criteria, such as current timing information and/or user identification information and/or ambient temperature information.

In a first specific non-limiting implementation, at least some ambience settings in the set of ambience settings may be associated to respective time periods. In such implementation, the selection of the specific ambience setting from the set of ambience settings stored in the memory device may be performed at least in part by processing information associated with current timing information (which may convey one or more of month information, weekday information, period of day information, hours and/or minutes for example). In this manner the specific ambience setting selected may vary according to the time of day (e.g. morning or evening) or the day of the week (e.g. weekday or weekend) or time of year (e.g. winter months or summers months).

In a second specific non-limiting implementation, at least some ambience settings in the set of ambience settings may be associated to respective ambient temperatures or ambient temperature ranges. In such implementation, the control panel may include (or be in communication with) a temperature sensor and the selection of the specific ambience setting from the set of ambience settings stored in the memory device may be performed at least in part by processing information conveying ambient temperature measurements obtained from the temperature sensor. In this manner the specific ambience setting selected may vary according to the ambient temperature (e.g. warm day, cold day, sunny, cloudy, humidity level and the like).

In a third specific non-limiting implementation, at least some ambience settings in the set of ambience settings may be associated with respective user identifiers. In such implementation, the selection of the specific ambience setting from the set of ambience settings stored in the memory device may be performed at least in part by processing information associated with a user identity. In this manner the specific ambience setting selected may vary according to the user of the bathing unit system so that a distinct desired total effect may be achieved depending on who is using the bathing unit system.

In some practical implementations, the information associated with the user identity may be received at the control panel via a user identification signal, which may originate from an auxiliary device external to the bathing unit system.

In specific non-limiting implementations of a first type, the user identification signal may be transmitted over a wireless communication link, such as for example a radio frequency (RF) link, directly to the control panel. In some implementations of this type, the control panel may be equipped with hardware and software components suitable to allow the control panel to establish a wireless communication link with auxiliary devices to receive the user identification signal. In specific practical implementations, the auxiliary device may be any suitable device capable of communicating information conveying user identity information such as, for example but without being limited to, a smartphone, a smartwatch, a wearable electronic activity tracker (such as a fitness band) and/or a near-field communication (NFC) or RFID enabled device. In a specific practical example of implementation, the auxiliary device may be in the form of an RFID or NFC chip implanted in a portion of a user's body (for example in a user's hand, arm, leg or other suitable body part). Any suitable communication protocol and associated software/hardware component may be provided to allow the control panel to receive the user identification signal from the auxiliary device. In a non-limiting example of implementation, a protocol suitable for short range communication, such as Bluetooth for example, may be used. In specific non-limiting implementations of a second (alternative) type, rather than being transmitted to the control panel directly from the auxiliary device, the user identification signal may be transmitted over a wireless communication link to the control panel through one or more other component of the bathing unit system, such as for example through the controller of the bathing unit and/or through an audio/visual component of the system. In implementations of this alternate type, the controller, audio/visual component and/or other component of the bathing unit system may be equipped with hardware and software components suitable to allow establishing a wireless communication link with the auxiliary device (to receive the user identification signal) and to establish another communication link with the control panel over which data conveying the user identity may be transmitted.

In some specific practical implementations, the criteria for selecting the specific ambience setting from the set of ambience settings stored in the memory device may be used independently or in combination. For example, a specific ambience setting may be associated to a specific user and to certain timing information (time of day and/or day of the week). Many other combinations are possible and will become apparent to persons skilled in the art in light of the present document.

In accordance with a second aspect, a topside control panel for a bathing unit system is proposed, the topside control panel comprising:
a) a housing;
b) a display touch or presence-sensitive assembly positioned upon the housing, the touch or presence-sensitive assembly including one or more tactile zones for associating user tactile input to software-implemented actions;
c) a circuit board assembly positioned in the housing, the circuit board assembly being electrically coupled to the display touch or presence-sensitive assembly, said circuit board including:
  i) a memory device storing a set of ambience settings; and
  ii) a processor in communication with said memory device, said processor being programmed for:
    1) generating a control signal in response to a unitary user tactile input event performed by a user in connection with a specific one of the one or more tactile zones, the control signal conveying an ambiance activation command associated with a specific ambience setting, the generation of the control signal comprising selecting the specific ambience setting from the set of ambience settings stored in the memory device;
    2) transmitting the control signal over a communication link to a controller associated with the bathing unit system for causing the bathing unit system to transition from being in a rest mode to operating in accordance with the specific ambience setting.

In some specific examples of implementation, the display touch or presence-sensitive assembly of the topside control panel may be responsive to changes in capacitance resulting from touching or close proximity of an object to the touch or presence-sensitive layer to generate and transmit signals to the processor. The specific one of the one or more tactile zones may provide haptic feedback and/or may include a mechanical actuator.

In some examples of implementation, the display touch or presence-sensitive assembly may include a display screen portion and the processor may be programmed for causing the display screen to display information conveying the specific ambiance setting selected in response to the unitary user tactile input event performed by the user.

In some specific examples of implementation, the selection of the specific ambience setting from the set of ambience settings stored in the memory device, which may include one or two or more selectable ambience settings, may be performed based on one or more criteria independent from information provided by the user through the unitary user tactile input event. For example, the selection of the specific ambience setting from the set of ambience settings may correspond:
(1) to an ambience setting in the set of ambience settings most recently used to operate the bathing unit system;
(2) to a default ambience setting, which may be predetermined and stored in the memory at the time the control panel is configured or may be programmed by a user at another time and stored on the memory.

Alternatively, or in combination with the above, the selection of the specific ambience setting from the set of ambience settings may be based on other criteria, such as current timing information and/or user identification information and/or ambient temperature information.

In some specific practical implementations, at least some ambience settings in the set of ambience settings may be associated with respective user identifiers. In such implementation, the selection of the specific ambience setting from the set of ambience settings stored in the memory device may be performed at least in part by processing information associated with a user identity. In this manner the specific ambience setting selected may vary according to the user of the bathing unit system.

In some practical implementations, the information associated with the user identity may be received at the topside control panel via a user identification signal, which may originate from an auxiliary device external to the bathing unit system.

In specific non-limiting implementations of a first type, the user identification signal may be transmitted to the topside control panel over a wireless communication link, such as for example a radio frequency (RF) link, directly to the control panel. In some implementations of this type, the control panel may be equipped with hardware and software components suitable to allow the control panel to establish a wireless communication link with the auxiliary device to receive the user identification signal. In specific practical implementations, the auxiliary device may be any suitable device capable of communicating information conveying user identity such as, for example but without being limited to, a smartphone, a smartwatch, a wearable electronic activity tracker (such as a fitness band) and/or a near-field communication (NFC) or RFID enabled device. In specific practical example of implementation, the auxiliary device may be in the form of an RFID or NFC chip implanted in a portion of a user's body (for example in a user's hand, arm, leg or other suitable body part). Any suitable communication protocol and associated software/hardware component may be provided at the topside control panel to allow the topside control panel to receive the user identification signal from the auxiliary device. In a non-limiting example of implementation, hardware and a protocol suitable for short range communication, such as Bluetooth for example, may be used.

In some implementations of the type described above, the processor of topside control panel may be programmed for receiving a user identification signal conveying user identification information and to select the specific ambience setting from the set of ambience settings stored in the memory device at least in part by processing the user identification information.

In some specific practical implementations, the memory device of the topside control panel may include a memory component responsive to a user identification signal carrying user identification information received over a wireless communication link from an auxiliary device external to the topside control panel for causing a user preference update process to be performed at the topside control panel. The user preference update process may include in some cases storing the user identification information on the memory component.

In some implementations of the type described above, the selection of the specific ambience setting from the set of ambience settings stored in the memory device may include selecting the specific ambience setting at least in part by processing the user identification information received from the auxiliary device.

In some specific practical implementations, the memory component of the control panel may be a passive memory component responsive to the signal received from the auxiliary device and carrying user identification information for drawing energy from that signal to activate the passive memory component and cause the identification information to be stored in the passive memory component. The wireless communication link may be a radio frequency (RF) communication link, such as for example a short range RF communication link, established between the memory component and the auxiliary device.

In some specific practical implementation, the passive memory component may include a near field communication memory (NFC memory) and the auxiliary device external from which the signal conveying identification information is received is embodied in an NFC enabled computing device. Advantageously, the use of an NFC memory on the topside control panel allows the user preference update process to be performed in the absence of a source of electrical power to topside control panel. This may allow an ambience setting to be selected by a user on powering up of the topside control panel.

In some specific practical implementations, the auxiliary device may be one of a smart phone, smart watch, wearable electronic activity tracker (such as a fitness band) or any other suitable device that may be establish a communication link with the topside control panel.

In some alternate specific non-limiting implementations, rather than being transmitted to the control panel directed from the auxiliary device, the user identification signal may be transmitted over a wireless communication link to the control panel through one or more other component of the bathing unit system, such as for example through the controller of the bathing unit and/or through an audio/visual component of the system. In implementations of this alternate type, the controller, audio/visual component and/or other component of the bathing unit system may be equipped with hardware and software components suitable to allow establishing a wireless communication link with the auxiliary device (to receive the user identification signal) and to establish another communication link with the control panel over which data conveying the user identity may be transmitted.

In accordance with another aspect, a bathing unit system is proposed comprising a receptacle for holding water, a plurality of bathing unit components including at least a circulation pump and a heater, a controller for controlling operational settings associated with the bathing unit components and a topside control panel of the types described above. The topside control panel is in communication with the controller for allowing a user of the bathing unit system to control and/or monitor operational settings of at least some of the bathing unit components in the bathing unit system.

In specific practical implementations, the receptacle for holding water includes a peripheral wall and the control panel is positioned on an upper portion of the peripheral wall of the receptacle.

In accordance with another aspect, a method is proposed for causing a bathing unit system to transition from operating in a first operational mode to operating in accordance with an ambience setting, the bathing system including a set of bathing unit components, a controller for operating the set of bathing unit components and a control panel in communication with the controller, the control panel including a user operable actuator. The method comprises generating a control signal in response to a unitary user input event performed by a user at the control panel, the control signal conveying an ambiance activation command associated with a specific ambience setting. The unitary user input event performed at the control panel is an actuation of the user operable actuator by the user at the control panel. The generation of the control signal comprises selecting the specific ambience setting from a set of ambience settings stored in a memory device, wherein the selection is performed based on criteria independent from information provided by the user through the actuation of the user operable actuator. The method further comprises transmitting the control signal conveying the ambiance activation command from the control panel to the controller over a communication link. The method further comprises, at the controller, processing the control signal conveying the ambiance activation command received from the control panel to cause the bathing unit system to transition from being in the first operating mode to operating in accordance with the specific ambience setting.

In specific practical implementation, the first operational mode may be a rest mode or another ambience setting distinct from the specific ambience setting.

All features of embodiments which are described in this disclosure and are not mutually exclusive can be combined with one another. Elements of one embodiment can be utilized in the other embodiments without further mention. Other aspects and features of the present invention will become apparent to those ordinarily skilled in the art upon review of the following description of specific embodiments in conjunction with the accompanying Drawings.

BRIEF DESCRIPTION OF THE DRAWINGS

A detailed description of the embodiments of the present invention is provided herein below, by way of example only, with reference to the accompanying drawings, in which:

FIG. 8 shows a bathing unit on which is installed on an outer peripheral wall a topside control panel in accordance with a specific practical example of implementation of the present invention.

Figure 1:
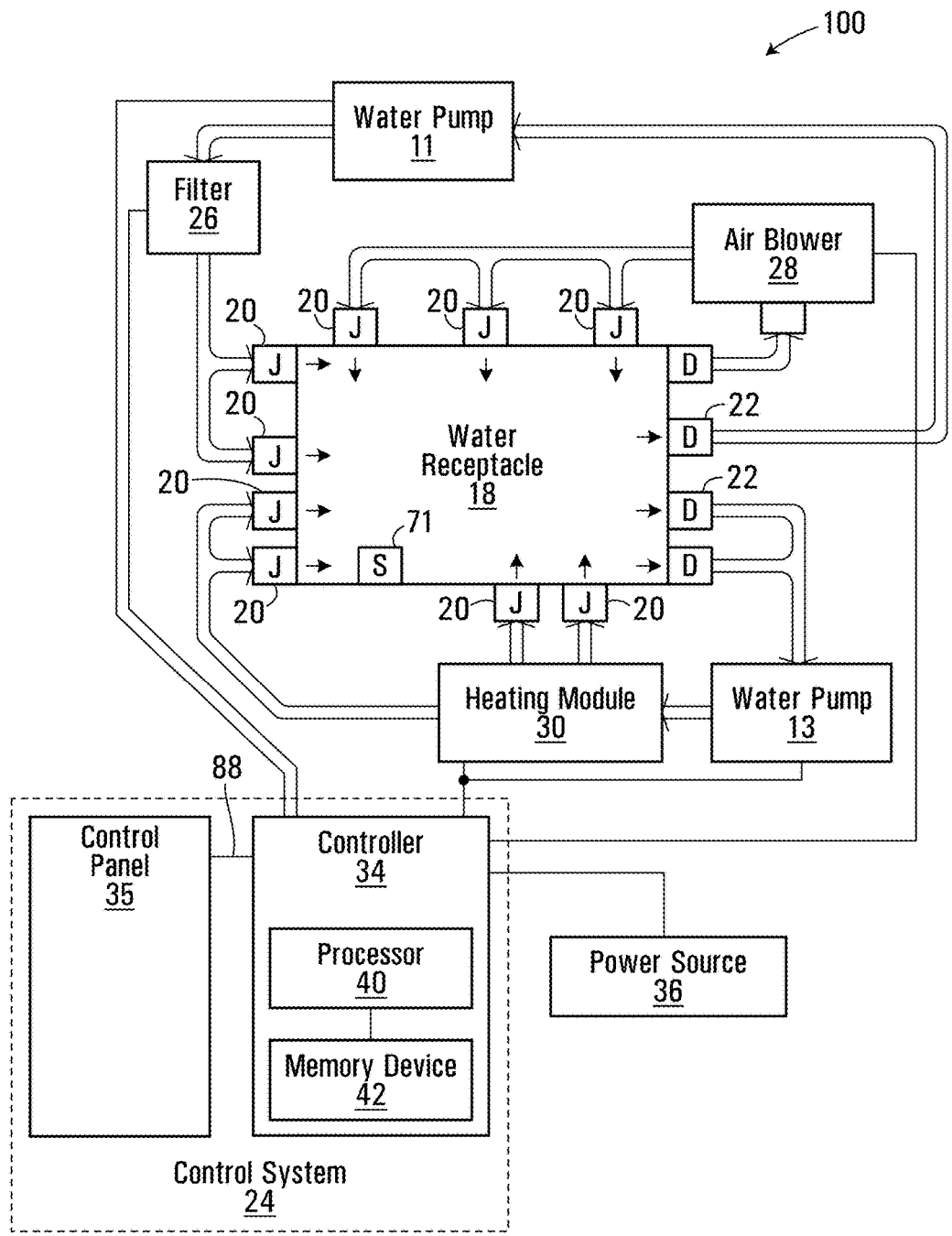
FIG. 1 shows a block diagram of a bathing system equipped with a control panel in accordance with a specific example of implementation of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

The description below is directed to a specific implementation of the invention in the context of a bathing unit system. It is to be understood that the term "bathing unit system", as used for the purposes of the present description, refers to spas, whirlpools, hot tubs, bathtubs, therapeutic baths, swimming pools and any other type of bathing unit that can be equipped with a controller and associated user control interface for controlling various operational settings of component in the bathing unit system.

FIG. 1 illustrates a block diagram of a bathing unit system 100 equipped with a control system having a control panel 35 in accordance with a specific example of implementation of the present invention.

The bathing unit system 100 includes a water receptacle 18 for holding water, a set of drains 22 and a control system 24 comprised of a controller 34 and of the control panel 35. In the specific embodiment shown in FIG. 1, the bathing unit system 100 further includes a set of bathing unit components (also referred to hereinafter as "comfort components") comprising a heating module 30, two water pumps 11 and 13, a plurality of jets 20, a filter 26 and an air blower 28. It should be understood that, in alternate embodiments, the bathing unit system 100 could include more or less of the same or of different bathing unit components. For example, although not shown in FIG. 1, the bathing unit system 100 may include an ozonator, a lighting system for lighting up the water in the receptacle 18, multimedia devices such as an MP3 player, a CD/DVD player as well as any other suitable device.

In normal operation, water flows from the bathing unit receptacle 18, through the drains 22 and is pumped by water pump 13 through the heating module 30 where the water is heated. The heated water then leaves the heating module 30 and re-enters the bathing unit receptacle 18 through jets 20.

In addition, water flows from the bathing unit receptacle 18, through different drains 22 and is pumped by water pump 11 through filter 26. The filtered water then re-enters the bathing unit receptacle 18 through different jets 20. Water can flow through these two cycles continuously while the bathing unit system 100 is in operation. Optionally, water can also flow from the bathing unit receptacle 18 through one or more drains 22 to an air blower 28 that is operative for delivering air bubbles to water that re-enters the bathing unit receptacle 18 through jets 20.

In the non-limiting embodiment shown, the control system 24 includes a controller 34 including circuitry for controlling the operational settings of the different components in the set of bathing unit components 11, 13, 20, 26, 28, 30. In the embodiment depicted in FIG. 1, the circuitry for controlling the operational settings of the different components is shown as including a processor 40 and a memory 42 that are in communication with one another over a communication bus. The processor 40 may be configured for accessing and processing program instructions stored within the memory 42 for enabling the controller 34 to control the set of bathing unit components 11, 13, 20, 26, 28 and 30 at least in part on the basis of those program instructions and commands received from a user, for example via the control panel 35.

As depicted, the controller 34 receives electrical power from an electric power source 36 that is connected to the controller 34 via service wiring 31. The power source 36 supplies the controller 34 with any conventional power service suitable for residential or commercial use. The controller 34 may then controls the distribution of power supplied to the various bathing unit components 11, 13, 20, 26, 28, 30 and to the control panel 35 in order to cause a desired operational settings to be implemented. Manners in which the controller 34 controls the operation of the individual bathing unit components of the bathing unit system, such as for example the jets 20, the drains 22, the heating module 30, the water pumps 11 and 13, the filter 26, the air blower 24, a valve jet sequencer for massage, a variable speed pump with a pre-programmed massage setting, a water fall, an aroma therapy device and an atomizer, as well as any lighting and multimedia components, are well known in the art and are not critical to the invention and as such will not be described in further detail here.

In a non-limiting implementation, the power source 36 can supply 240 volts (V) AC to the controller 34 via service wiring 31. In an alternative non-limiting implementation, the power source 36 can supply 120 volts (V) AC to the controller 34 via service wiring 31. In yet a further alternative non-limiting implementation, the power source 36 can supply 120 Volts and 240 Volts AC to the controller 34 via service wiring 31. It is to be appreciated that other voltage supply values or voltage supply combinations, for example depending on geographical location, are possible. In a non-limiting implementation, the service wiring 31 is passed through a ground fault circuit interrupter (GFCI) that is adapted for tripping in the presence of a current leakage to the ground. The ground fault circuit interrupter (GFCI) provides an added safety measure to the bathing unit system.

The controller 34 is in communication with the control panel 35 over communication link 88, which may be a wire line data bus or a wireless communication link for example, for receiving commands originating from a user input provided at the control panel 35. In some implementations, the controller 34 may also be configured for receiving commands from auxiliary devices (not shown in FIG. 1) external to the bathing unit system 10, for example via RF signals, infrared signals, or via a network communication (over an Intranet or the Internet) in accordance with any suitable method. One approach is described is U.S. Patent publication No. US20130166965 A1 entitled "Method and system for providing remote monitoring and control of a bathing system". Other approaches are described in U.S. Pat. No. 8,644,960 entitled "Method and system for providing ambiance settings in a bathing system" (in regard to FIG. 4 amongst other). The contents of the aforementioned documents are incorporated herein by reference. These and various other approaches and systems for remotely controlling bathing unit systems are known in the art and not critical to the invention and will thus not be described further here.

As mentioned above, the bathing unit system 100 is equipped with a control panel 35 in accordance with a specific example of implementation of the present invention.

The control panel 35 provides an interface for allowing a user of the bathing unit system 100 to provide commands or other information to the controller 34 of the control system 24. In specific practical implementations, via the user control panel 35, a user may be able to enter commands that can be implemented by the controller 34 for controlling the activation and operational settings of the various bathing unit components and for monitoring the operational status of the bathing unit components as well as for monitoring operational characteristics of the bathing unit system, such as water temperature, ambient temperature and/or water quality for example.

In particular, the control panel 35 may send signals to the bathing unit controller 34 over a communication link 88 for controlling operational setting of bathing unit components in the system 100. Similarly, the control panel 35 may receive over communication link 88 incoming signals from the bathing unit controller 34, which can include signals conveying operational settings of the bathing unit system 100 and well as various metrics obtained through sensors (e.g. water temperatures sensor 71, ambient temperature sensor, water quality metrics sensors etc. . . . ). In some implementations, the control panel 35 may also receive from the bathing unit controller 34 data conveying user identification information associated with a user of the bathing unit system. As such, via the control panel 35, a user is able to enter commands that can be implemented by the controller 34 for controlling the activation and operational settings of the various bathing unit components.

In specific practical implementations, the control panel 35 provides a user operable interface including one or more user operable input devices that allow a user to enter commands for causing the controller 34 to control various operational settings of the bathing unit components 11, 13, 20, 26, 28, 30 in accordance with the preferences of a user. Some non-limiting examples of operational settings include temperature control settings, jet control settings, and lighting settings, among other possibilities. In a non-limiting embodiment where the bathing unit is connected to entertainment and/or multimedia modules, the operational settings of the bathing unit may also include audio settings and video settings, amongst others. Consequently, the expression "operational settings", for the purpose of the present invention, is intended to cover operational settings for any suitable bathing unit component or components that can be operated by a user of the bathing unit system 100.

The control panel 35 may further provide a menu driven interface through which a user can navigate and be presented with a set of selectable ambience options, wherein each ambience option is associated with a respective set of operational setting for different bathing unit components, each set corresponding to a respective desired total effect (or ambience) for the bathing unit system. Upon selection of one of the presented options, the bathing unit system is caused to apply corresponding operational settings to different bathing unit components in the system in order to achieve a corresponding desired total effect (or ambience). An example of such functionality is described in U.S. Pat. No. 8,644,960 entitled "Method and system for providing ambiance settings in a bathing system", the contents of which are incorporated herein by reference.

As will become apparent from the present description, the control panel 35 aims to provide functionality for allowing a user to cause the bathing unit system 100 to operate in accordance with an ambience setting by way of a unitary user input event performed at the control panel 35.

Example of processes and component for achieving such functionality are described below in the present document with reference to FIGS. 2 to 6 described below.

For the purpose of simplicity and conciseness, while the control panel 35 may provide many different functions, the description from hereon will focus on the functionality and components pertaining to allowing a user to cause the bathing unit system 100 to operate in accordance with an ambience setting by way of a unitary user input event performed at the control panel 35. It is to be understood that such functionality may be provided instead of, or in combination with, other functionality in the control panel 35 through suitable software and hardware components as will become readily apparent from the person skilled in the art in view of the description.

Control Panel 35

Figure 2:
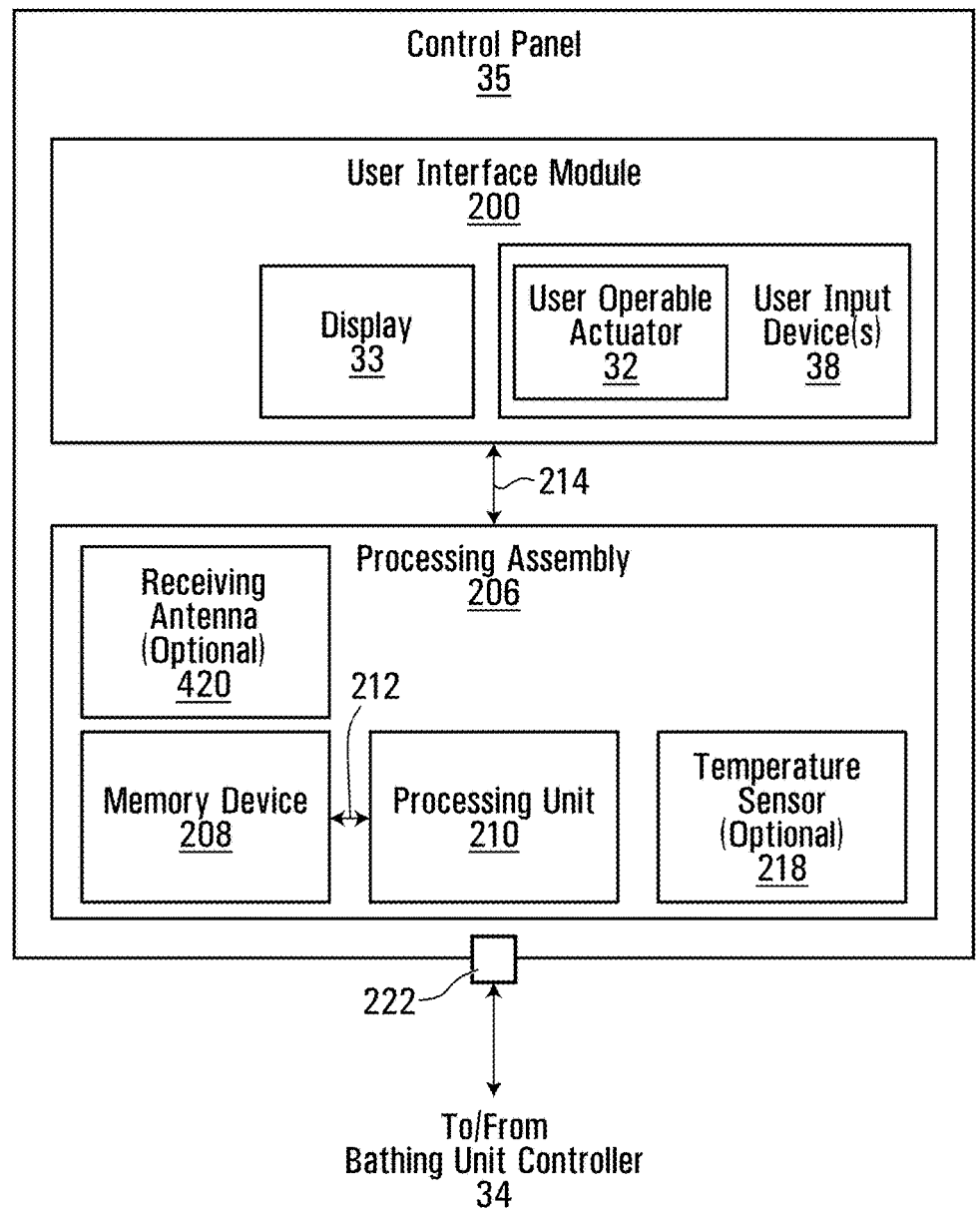
FIG. 2 shows a functional block diagram of the control panel of the bathing system in accordance with a specific example of implementation of the present invention, the control panel including a user interface module and a processing assembly.

FIG. 2 shows a functional block diagram of the control panel 35 of the bathing system 100 in accordance with a specific example of implementation of the present invention.

As depicted, the control panel 35 includes a user interface module 200 and a processing assembly 206 in communication with one another over communication link 214. The control panel 35 may also include one or more communications interfaces for receiving or sending data to external electronic devices. In the embodiment depicted in FIG. 2, the control panel 35 includes a communication interface 222 for allowing the control panel 35 to communicate with the controller 34 (shown in FIG. 1) by sending and/or receiving signals to/from the controller 34 over communication link 88. In specific practical implementations, the communication interface 222 may be a wired interface so that the communication between the control panel 35 and the controller 34 is made over a wire-line link. Alternatively, the communication interface 222 may be a wireless interface so that the communication between the control panel 35 and the controller 34 is made over a wireless link, such as a RF link for example. Additional communication interfaces may also be provided at the control panel 35 in alternative embodiments.

User Interface Module 200

The user interface module 200 provides components for enabling interactions with a user of the bathing unit system 100, including receiving information from and conveying information to the user. In the embodiment depicted, the user interface module 200 comprises one or more user input devices 38 and a display screen 33. The display screen 33 is operative for receiving and processing display command signals from the processing assembly 206 for displaying a graphical user interface (GUI) to a user. The GUI may provide the user with information pertaining to the bathing unit system 100, which may include for example water temperature and operational status of various components for example. In addition, the GUI may enables the user to view various selectable control options as well as allow the user to provide input commands for controlling various bathing unit components of the bathing unit system through the one or more user input devices 38. In this regard, the GUI may implement a plurality of different display windows through which a user can navigate using the one or more user input device 38 in order to access desired information and provide desired inputs for adjusting and activating operational settings of the bathing unit components.

As will be described later below, at least one user input device 32 (herein referred to as user operable actuator 32) amongst the one or more user input devices 38 allows a user to cause the control panel 35 to generate control signals conveying an ambiance activation command associated with a specific ambience setting by performing a unitary user input event, the control signals being for causing the bathing unit system 100 to transition from being in a first operational mode (for example a rest mode) to operating in accordance with the specific ambiance setting.

The nature of the user operable actuator 32, and therefore the nature of the type of unitary user input event performed by the user at the control panel 35, may differ in different implementations. For example, the user operable actuator 32 may be in the form of a tactile zone on the display 33, a mechanically operated actuator (such as a switch or a push-button for example), a light detection module, a movement detection module and/or any other suitable user operable actuator allowing a user to perform a unitary user input event. In specific practical implementations, the user operable actuator 32 may comprise a trackball, mouse, gyroscope remote (which senses movement of the device in the air so as to move a cursor), a keypad, a touch sensitive screen, turn-dials, turn-and-push dials (such as iDrive™ from BMW®), a stylus pen or a microphone, among other possibilities. The user operable actuator 32 may also include one or a combination of any or all of the above input devices.

Depending on the nature of the user operable actuator 32, the unitary user input event for causing the bathing unit system to transition from being in a first operational mode (for example a rest mode) to operating in accordance with the specific ambiance setting may be manual, visual (for example a light or an absence of light), auditory (noise), (or) kinesthetic (a movement) or any other suitable type of actuation. In a specific non-limiting implementation, the user operable actuator 32 may be in the form of a tactile zone on the display 33 of the control panel 35 and may optionally be configured for providing haptic feedback. In another specific non-limiting implementation, the user operable actuator 32 may be in the form of a mechanically operated actuator (such a push-button or key for example) and the unitary user input event in such cases may therefore be a manual actuation of the user operable actuator 32 through a push-button like action for example. In another specific non-limiting implementation, the user operable actuator 32 may be in the form of a motion detector and the unitary user input event in such cases may therefore be a specific hand gesture. Many other examples of implementation are possible and will become apparent to the person skilled in the art after reading of the present document.

In practical implementations in which the user operable actuator 32 is in the form of a push-button, it will be observed that for further facilitating use and/or recognition, the user operable actuator 32 may have physical features that may distinguish it from other push-buttons that may be present on the user interface module 200 and/or physical features that may convey to a user the nature of a function it provides. For example, the user operable actuator 32 in the form a push-button may have a distinguishing color (e.g. green or red) while other push-buttons may have another color, such as black or grey and/or a distinguishing structure, e.g. a specific shape and/or an embossed or debossed surface and/or printed unique symbol appearing thereon, and/or be of a size that is larger than that of other push-buttons that may be present on the user interface module 200. In a non-limiting implementation, the user operable actuator 32 may be a push-button labelled "Quick-start" or "Easy-start" (the label appearing either directly on the push-button or in the vicinity thereof) to convey to a user of the system that the bathing unit system can be activated through the unitary user input event of performing a push-button like action with the user operable actuator 32. A myriad of alternate implementations will be apparent from the present description and as such, will not be further described here.

Processing Assembly 206

As mentioned above, the user interface module 200 is in communication with the processing assembly 206 over communication link 214. The processing assembly 206 includes suitable hardware, firmware and/or executable software code for implementing various functions for the control panel 35.

In the embodiment depicted in FIG. 2, the processing assembly 206 includes a memory device 208 and a processing unit 210 in communication with one another over a communication bus 212.

The memory device 208 stores program instructions executable by the processing unit 210 as well as data and may be comprised of a single memory unit or of a plurality of memory units. When the memory device 208 is comprised of a plurality of memory units, the memory units may be of a same type or of different types.

As part of the data, the memory device 208 may store a set of ambiance settings including one or more ambiance settings, where each ambiance setting is associated with a corresponding set of operational settings for bathing unit components in the bathing unit system 100 to obtain a desired total effect (or ambience) for the bathing unit system 100.

More specifically, information conveying different ambience settings may be stored in the memory device 208 and may be pre-programmed, for example at the time of manufacturing of the user control panel 35 or through a user or manufacturer initiated software update process. Alternatively, or in addition to the above, one or more of the ambience settings stored in memory device 208 may be programmed by a user through the user interface module 200 or via another suitably programmed remote user computing device. Ambiences may be programmed through the user interface module 200 or via another suitably programmed remote user computing device in any suitable manner known in the art. For example, methods of the type described in U.S. Pat. No. 8,644,960 entitled "Method and system for providing ambiance settings in a bathing system", may be used to create and store new ambiences in the memory device 208. Alternatively, some or all the operational setting associated with one or more of the ambience settings may be stored on a memory device external to memory device 208, such as for example on a portable memory device or, alternatively, in the memory device 42 of the controller 34 (shown in FIG. 1) and be electronically accessible via the control panel 35.

In practical implementations of the present invention, the set of ambient settings may include at least one ambiance settings associated with different types of bathing unit components; for example, heating module 30, water pumps 11 and 13, air blower 28, lighting units (not shown), audio system (not shown), and the like. In an alternate embodiment, the set of ambient settings may include two or more of the ambiance settings associated with different types of bathing unit components.

It should be appreciated that one or more bathing unit components may be associated to each type of bathing unit component may include, and the control panel 35 may be configured to include pre-programmed operational settings for the multiple bathing unit components of a given type of bathing unit component.

The ambiance settings may include pre-programmed component activation status, for example, for a given ambiance setting, the ambiance setting would cause activation of water pumps 11 and 13, but deactivation of air blower 28. Additionally or alternatively, ambiance settings may include pre-programmed operational settings for a level of activation of each bathing unit component; for example, in the above ambiance setting, the ambiance setting would cause activation of the heating module such that the water temperature would acquire a 104° F. water temperature, and the audio system to broadcast the "Wine, New Bern" internet radio station out of North Carolina.

In other words, the pre-programmed ambiance settings may cause activation of operational settings associated with different types of bathing unit components, such as variable speed water pumps for water jets, the lighting units, the audio system, the heating module, the sanitization system, and the like. Furthermore, an ambiance setting instead of causing the activation of a single speed for a pump, may cause the activation of a pre-programmed massage function for each variable speed pump that provides a sequence of different speeds according to a pre-defined massage profile.

As for the light, the ambiance setting may cause the activation of a desired color, a desired light intensity, or pre-programmed color sequences to create some ambiance effect.

Although the bathing unit component types for which operational settings have been described above as comprising the water heater, the water pumps, the lighting units, the variable speed pumps for the water jets, the audio system, and the sanitization system, it should be appreciated that the bathing unit component types could also include additional or fewer bathing unit component types known in the art.

Examples of pre-programmed ambiance settings may thus include pre-set ambiance settings such as a "relaxation setting", a "beach party" setting, an "after work" setting, or ambiance settings associated with user identification information, such as "Jen's setting", "Ben's setting" and/or identification information associated with a personal electronic device belonging to a specific person (for example a media access control addresses (MAC address) of a smartphone, smart watch, personal wearable electronic activity tracker and the like), or ambiance settings associated with a previously used setting such as "last used setting" and/or or ambiance settings associated with specific timing information (such as time of day, day of the week and/or time of the year for example). Each setting may be associated with a respective set of operational settings for a set of bathing unit components. For example, in the case of the "relaxation setting", the water jets may be pre-programmed to acquire a low jet speed, the lighting units may be pre-programmed to provide dim white light, and the audio system may be pre-programmed to acquire a soundtrack mimicking sounds of the ocean. In contrast, in the case of the "beach party setting", the water jets may be pre-programmed to acquire a high jet speed, the lighting units may be pre-programmed to acquire a flashing colors of light, a sanitation system is pre-programmed to be on a multi-person level, and the audio system may be pre-programmed to play an MP3 playlist of Caribbean music. As will be appreciated by the person skilled in the art, the specific operational settings associated with each ambiance setting can vary significantly and the present invention is not limited to any specific pre-programmed operational settings.

The ambiance settings may be programmed by a manufacturer of the bathing unit system 100 or by an individual user. For example, the manufacturer of the bathing unit system 100 may pre-program a plurality of different ambiance settings into the memory device 208. It is also possible for a user of the bathing unit system 100 to program one or more different ambiance settings into the memory device 208 through the user interface module 200. The manufacturer of the bathing unit system 100, or a third party, may also offer pre-programmed ambiance settings for download to memory unit 208.

The processing unit 210, which may include one or more processors, is in communication with the memory device 208 and is configured for accessing and processing program instructions and data stored within the memory device 208. The program instructions stored in the memory device 208, when executed by the processing unit 210, may implement at least some functions of the control panel 35 including, for example but without being limited to, the processing of signals originating from the user interface module 200. For example, the processing unit 210 may process a signal generated as a result of actuation of one or more of the user input devices 38 in order to generate signals to either cause display signals to be sent to the display 33 in order to display a specific GUI and/or to generate suitable control commands to be sent to the bathing unit controller 34 in order to control operational settings of components in the bathing unit system in a specific manner. For example, the program instructions stored in the memory device 208 may implement a menu driven interface through which a user can navigate by actuating the user input devices 38 and be presented on the display device with a set of selectable ambience options. As another example, the processing unit 210 may process signals originating from the bathing unit controller 34 in order to derive display signals to be sent to the display 33 in order to display a specific GUI. For example, the signals originating from the bathing unit controller 34 may convey status information and/or notifications pertaining to the operational status one or more of the bathing unit components in the bathing unit system 10 and/or information obtained from sensors in the bathing unit system (e.g. water temperature, ambient temperature, water quality and the like). Functions of the type described above are well known in the field of bathing unit systems and therefore will not be described further here as they may be implemented in accordance with any suitable manner known in the art.

The features implemented by the program instructions stored in the memory device 208 also include functionality for generating control signals conveying an ambiance activation command associated with a specific ambience setting following a unitary user input event being performed at the user interface module trough user operable actuator 32. Specific manners in which such functionality may be implemented will now be described with reference to FIG. 5 of the drawings.

Figure 5:
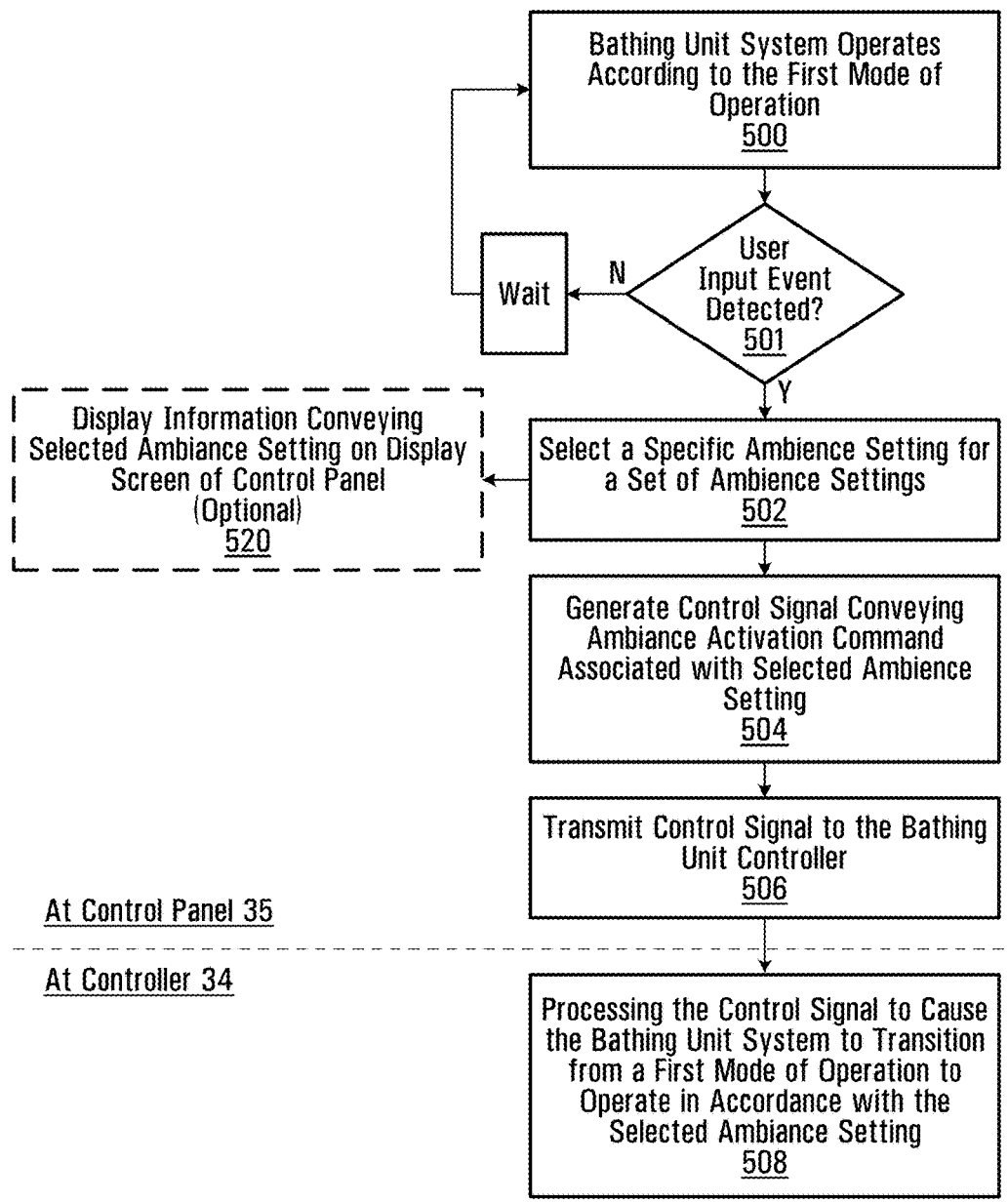
FIG. 5 shows a process according with a non-limiting example of implementation of the invention for causing the bathing unit system shown in FIG. 1 to transition from operating according to a first operational mode to operating in accordance with a specific ambience setting.

In particular, FIG. 5 shows a process for causing a bathing unit system to transition from operating according to a first operational mode to operating according to a second operational mode, in this case a specific ambience setting, following a unitary user input event being performed at the user interface module trough user operable actuator 32.

As shown in FIG. 5, at step 500, the bathing unit system is shown as operating according to a first operational mode.

In a first practical example, the first operational mode may be a rest mode and the second operational mode may be a specific ambience setting. The rest mode may be an operational mode in which the bathing unit system is unlikely to be in use by a bather. For example, in the rest mode, bathing unit components involved in water circulation, filtering and heating may be operated (either normally or in a reduced manner) but jets, lights, entertainment and other such components may be deactivated. The actual operational configuration of the bathing unit system 100 components in the rest mode will be apparent to the person of skill and will thus not be further described here. In the rest mode, the display 33 33A 33B (shown in FIGS. 2, 3 and 4) may in some implementations be deactivated in order to conserve energy or, alternatively, may display a screen-saver type of image.

In an alternative embodiment, the first operational mode may be an ambience setting distinct from the specific ambience setting.

At step 501, the control panel 35 is shown as monitoring user input event performed. For the purpose of simplicity, the example will only be concerned of a user input event being performed using the user operable actuator 32, wherein the user input event corresponds to a unitary user input event. As described above, the unitary user input event performed at the control panel is an actuation of the user operable actuator by the user at the control panel. While no user input event is detected at the control panel 35, the process remains at steps 500 and 501 where the bathing unit system continues to operate according to the first operational mode. If a user input event (corresponding to a unitary user input event) is detected at step 501, the process proceeds to step 502.

At step 502, the processing unit 210 processes the signal generated by the unitary user input event in order to select a specific ambience setting from a set of ambience settings stored in memory device 208 (shown in FIG. 2).

In a situation in which the set of ambience settings stored in memory device 208 includes only one ambience setting, at step 502, the processing unit 210 may select as the specific ambience setting the only ambience setting stored in the memory device 208.

In a situation in which the set of ambience settings stored in memory device 208 may include two or more selectable ambience settings, at step 502, the processing unit 210 may select the specific ambience setting based on various criteria independent from information provided by the user through the actuation of the user operable actuator 32.

In a first example, the specific ambience setting selected from the set of ambience settings may correspond to an ambience setting most recently used to operate the bathing unit system. In such a case, the processing unit 210 may be programmed to store information identifying one or more of the most recently selected ambience in the memory device 208. The ambience may have been defined and/or selected in any suitable manner when operating the bathing unit system. For example, the ambience setting most recently used to operate the bathing unit system may have been defined and/or selected according to methods of the type described in U.S. Pat. No. 8,644,960 entitled "Method and system for providing ambiance settings in a bathing system", for example. The contents of the aforementioned documents are incorporated herein by reference. In such a case, the processing unit 210 may be programmed to the set of ambient setting to select the ambience setting most recently used to operate the bathing unit system. In another embodiment, the selection may be based on a randomization process to select a corresponding one amongst one or more most recently used ambiance setting. It is to be understood that a myriad of other implementations of the selection of a corresponding one of the one or more of the last used ambiance setting can be employed. Such alternative implementations will become apparent to the person skilled in the art in light of the present specification and as such will not be described further here.

In a second example, the specific ambience setting selected from the set of ambience settings may corresponds to a default ambience setting. The default ambience setting may be pre-programmed in the memory device 208 and selected (for example at the time of manufacturing) or may be programmed and/or selected as the default ambience setting by a user of the bathing unit system through the user interface module 200 (shown in FIG. 2) by providing suitable user interface functionality and/or through any other suitable manner, for example by using a remote or auxiliary device to upload information conveying ambience settings in which at least one ambience setting is identified as a default ambience setting.

In a third example, at least some ambience settings in the set of ambience settings stored in the memory device 208 may be associated to respective time periods, for example respective days of the week, respective times of the year, respective periods of the day, respective times (hours, minutes) for example. The time periods convey when associated ambience settings should be favored when a selection is to be made. The time periods to which are associated at least some ambience settings may be pre-programmed in the memory device 208 and pre-selected (for example at the time of manufacturing) or may be programmed and/or selected by a user of the bathing unit system through the user interface module 200 (shown in FIG. 2) by providing suitable user interface functionality and/or using any other suitable manner, for example by using a remote or auxiliary device to upload into the memory device 208 information conveying ambience settings in which one or more ambience settings are associated to respective time periods. In such a case, the processing unit 210 may be programmed to process information associated with current timing information to select the specific ambience setting from the set of set of ambience settings stored in the memory device at least in part based on the current timing information. The information associated with current timing information may convey one or more of month information, weekday information, period of day information, hours and/or minutes for example. In this manner the specific ambience setting selected may vary according to the time of day (e.g. morning or evening) or the day of the week (e.g. weekday or weekend) or time of year (e.g. winter months or summers months). For example, the type of music played and the intensity of the jets may be different according to whether the bathing unit system is being used in the morning or in the evening or whether the bathing unit system is being used on a week day or during the weekend. In a practical example, when the user performs the unitary user input event at the user operable actuator 32 on a Monday evening after work, say at 7 pm, the processing unit 210 processes information associated with the current timing information, i.e. the time of day, the day in week, to select the specific ambience setting from the set of ambience settings stored in the memory device 208, for example, the specific ambiance setting associated with "work day" (Monday) and "after" (7 pm), namely "after work" ambiance settings. In another example, when a user actuates the user operable actuator 32 on a Saturday afternoon of the month of July, say at 2 pm, the processing unit 210 processes information associated with the current timing information to select, for example, the ambiance setting associated with "non-work day" (Saturday), "summer" (July in the Northern hemisphere) and "day" (2 pm), namely "Beach party".

In a fourth specific non-limiting implementation, at least some ambience settings in the set of ambience settings stored in the memory device 208 may be associated to respective ambient temperatures or ambient temperature ranges. The ambient temperatures or ambient temperature ranges convey at which ambient temperatures associated ambience settings should be favored when selections are made. The ambient temperatures or ambient temperature ranges to which are associated at least some ambience settings may be pre-programmed in the memory device 208 and pre-selected (for example at the time of manufacturing) or may be programmed and/or selected by a user of the bathing unit system through the user interface module 200 (shown in FIG. 2) by providing suitable user interface functionality and/or using any other suitable manner, for example by using a remote or auxiliary device to upload information conveying ambience settings in which one or more ambience settings are associated to respective time periods. In such implementation, the control panel 35 (shown in FIG. 2) may include (or be in communication with) an ambient temperature sensor 218 in order to obtain measurements conveying an ambient temperature. In such a case, the processing unit 210 may be programmed to process information conveying an ambient temperature base on ambient temperature measurements obtained by the ambient temperature sensor 218 to select the specific ambience setting from the set of set of ambience settings stored in the memory device at least in part based on current ambient temperature measurements. In this manner the specific ambience setting selected may vary according to the ambient temperature (e.g. warm day, cold day, sunny, cloudy, humidity level and the like). While ambient temperature sensor 218 has been shown in FIG. 2 as being a component of the control panel 35, it is to be appreciated that such an ambient temperature sensor may be positioned elsewhere in the bathing unit system and the ambient temperature measurements taken may be communicated to the control panel in any suitable manner. For example, an ambient temperature sensor may be positioned at the controller 34 so that such measurements are received at the controller 34 rather than at the control panel 35. In such an implementation, the controller 34 may be programmed to transmit the measurements conveying an ambient temperature to the control panel 35 over a communication link so that such measurements are received by the control panel 35 at port 222 (shown in FIG. 2). Other variants of implementation are possible and will become apparent to the person skilled in the art in view of the present description.

In a fifth example, at least some ambience settings in the set of ambience settings stored in the memory device 208 may be associated to respective user identifiers. The user identifiers may specify which ambience settings should be favored for different users of the bathing unit system. In such implementations, the selection of the specific ambience setting from the set of ambience settings stored in the memory device may be performed at least in part by processing information associated with a user identity. For example, the memory device 208 can include the "Jen" and the "Ben" ambiance settings, where each ambiance setting is associated with a particular user (i.e., each one of "Jen" and "Ben"). The user identifiers to which are associated at least some ambience settings may be programmed and/or selected by a user of the bathing unit system through the user interface module 200 by providing suitable user interface functionality and/or using any other suitable manner, for example by using a remote or auxiliary device to upload information conveying ambience settings in which some ambience settings are associated with respective user identifiers. In some specific embodiments, the user identifiers may be associated to auxiliary electronic devices that users may carry or wear when using or being in proximity to the bathing unit system (for example smart phone, smart watch, wearable electronic activity tracker (such as a fitness band) and/or any other suitable device). In an alternative embodiment, the user identifiers may be associated to auxiliary electronic devices that may be implanted in users, such as for example an RFID or NFC chip implanted in a portion of a user's body (for example in a user's hand, arm, leg or other suitable body part). Such devices are commercially available. For example, the company Dangerous Things provides a 13.56 MHz ISO14443A & NFC Type 2 NTAG216 RFID chipset that is encased in a 2×12 mm cylindrical biocompatible glass casing and comes pre-loaded in an injection syringe assembly. It is to be appreciated that these are only examples and that other devices may be used to allow user identification information to be obtained.

In cases where user identification information is used as a criterion to select a specific ambience setting, the processing unit 210 may be programmed to process information associated with a user identity to select the specific ambience setting from the set of set of ambience settings stored in the memory device 208. In this manner the specific ambience setting selected may vary according to the user of the bathing unit system so that a distinct desired total effect may be achieved depending on who is using the bathing unit system.

In some practical implementations, the information associated with the user identity may be received at the control panel 35 via a user identification signal, which may originate from an auxiliary device external to the bathing unit system.

In specific non-limiting implementations of a first type, the user identification signal may be transmitted over a wireless communication link, such as for example a radio frequency (RF) link, directly to the control panel 35. In such implementation, the control panel may include a receiving antenna 420 (shown in FIG. 2) configured for establishing a communication link with the auxiliary device. The auxiliary device may be any suitable device capable of communicating information conveying user identity information such as, for example but without being limited to, a smartphone, a smartwatch, a wearable electronic activity tracker (such as a fitness band) and/or a near-field communication (NFC) or RFID enabled device. As mentioned above, in a specific practical example of implementation, the auxiliary device may be in the form of an RFID or NFC chip implanted in a portion of a user's body (for example in a user's hand, arm, leg or other suitable body part). In a non-limiting implementation, the user identifiers may convey media access control addresses (MAC address) associated to the auxiliary devices and at least some ambience setting stored in the memory device 208 (shown in FIG. 2) may be associated to respect MAC addresses thereby indirectly associating ambience settings to specific users via the electronic devices they may be carrying and/or wearing. Any suitable communication protocol and associated software/hardware component may be provided to allow the control panel 35 communication with the auxiliary device. In a non-limiting example of implementation, a protocol suitable for short range communication, such as Bluetooth for example, may be used.

Figure 6:
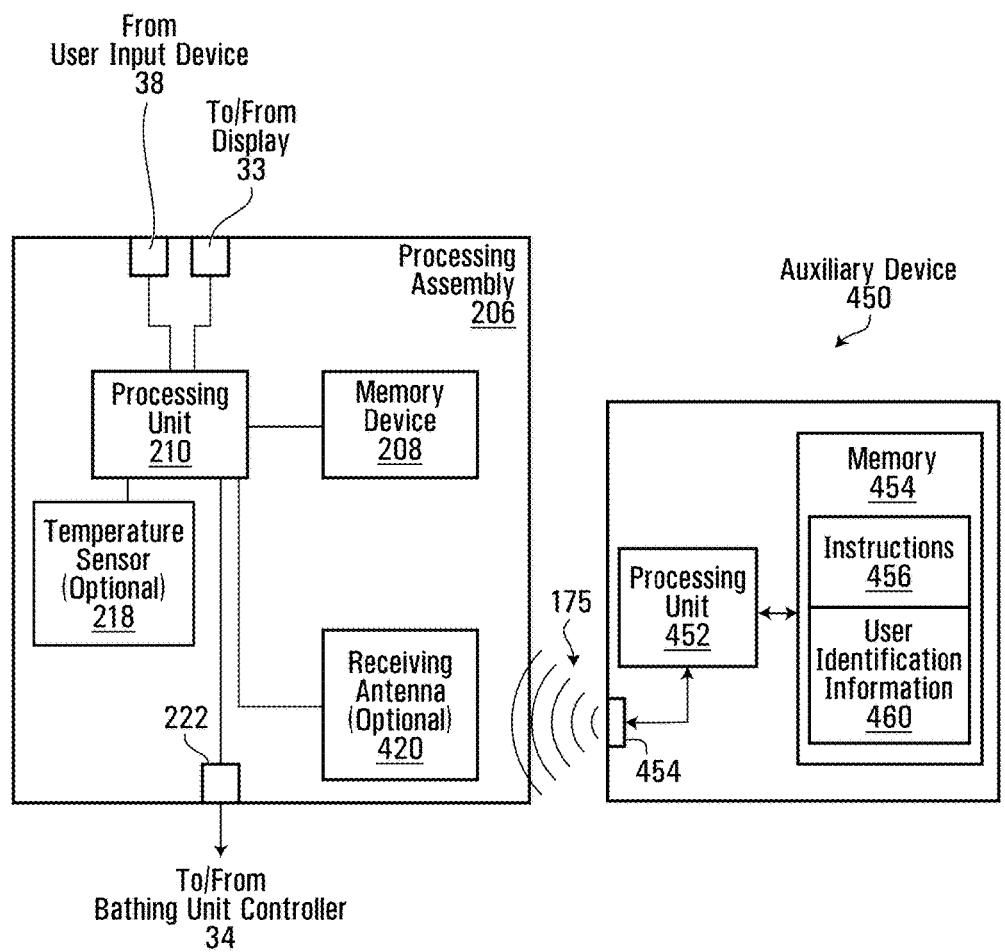
FIG. 6 shows a functional block diagram of the processing assembly of the control panel of FIG. 2 in accordance with a non-limiting example of implementation of the present invention together with a functional block diagram of an auxiliary device suitable for providing user identification information.

While the receiving antenna 420 for receiving user identification information has been shown in FIGS. 2 and 6 as being a component of the control panel 35, it is to be appreciated that such a device may be positioned elsewhere in the bathing unit system. In such an implementation, rather than being transmitted to the control panel 35 directly from the auxiliary device, the user identification signal may be transmitted over a wireless communication link to the control panel 35 through one or more other component of the bathing unit system, such as for example through the controller of the bathing unit and/or through an audio/visual component of the system. In implementations of this alternate type, the controller 34, audio/visual component (not shown) and/or other component of the bathing unit system 100 (shown in FIG. 1) may be equipped with hardware and software components suitable to allow establishing a wireless communication link with the auxiliary device (to receive the user identification signal) and to establish another communication link with the control panel 35 over which data conveying the user identity may be transmitted. For example, a communication antenna may be positioned at the controller 34 so that such user identification information may be received at the controller 34 and the controller 34 may be programmed to transmit data conveying the user identification information to the control panel 35 over a communication link so that such information is received by the control panel 35 at port 222 (shown in FIG. 2). Other variants of implementation are possible and will become apparent to the person skilled in the art in view of the present description.

In some specific practical implementations, the criteria for selecting the specific ambience setting from the set of ambience settings stored in the memory device may be used independently or in combination. For example, a specific ambience setting may be associated to a specific user identifier and to certain timing information (time of day and/or day of the week. Many other combinations are possible and will become apparent to persons skilled in the art in light of the present document.

FIG. 6 shows a functional block diagram of the processing assembly 206 of the control panel 35 of FIG. 2 in accordance with a non-limiting example of implementation together with a functional block diagram of an auxiliary device 450 suitable for providing user identification information. The auxiliary device 450 and the processing assembly 206 are configured to establish a communication link 175 there between for enabling the processing assembly 206 to receive information from, and/or transmit information to, the auxiliary device 450. In particular, the auxiliary device 450 may be configured for transmitting user identification information 260, which may be stored in a memory 454 of the auxiliary device 450. The memory 454 of the auxiliary device 450 may also store suitable instructions 456, which when executed by processing unit 452, allow for the transmittal of user identification information 460 to the processing assembly 206 over communication link 175. The communication link may be a wireless communication link, such as for example a short range radio frequency (RF) link. The auxiliary device may be any suitable device capable of communicating information conveying user identity such as, for example but without being limited to, a smartphone, a smartwatch, wearable electronic activity tracker (such as a fitness band) and/or a near-field communication (NFC) enabled device. In a specific practical example of implementation, the auxiliary device may be in the form of an RFID or NFC chip implanted in a portion of a user's body (for example in a user's hand, arm, leg or other suitable body part). Any suitable communication protocol and associated software/hardware component may be provided at the topside control panel to allow the topside control panel to receive communications from the auxiliary device. In a non-limiting example of implementation, hardware and a protocol suitable for short range communication, such as Bluetooth for example, may be used. In a non-limiting implementation, the user identifiers may convey media access control addresses (MAC address) associated to the auxiliary devices. It will however be appreciated that the user identifiers may be of different form such as for example user names, e-mail addresses or any other mechanism for allowing information conveying an identity of a user of the bathing unit system to be conveyed to the processing assembly 206.

As yet another example, user identity information may be obtained at the control panel 35 via a finger print taken from the user of the bathing unit. In such cases, the user identification signal received at the control panel 35 may be in the form of a finger print scan and the control panel 35 may be equipped with suitable hardware for generating the finger print scan, such as a finger print scanner, and suitable software for processing the figure print scan in order to use the finger print scan as an indicator of user identity. In specific practical implementations, the finger print scanner may be located on the control panel 35 so that a user may place his/her finger on the finger print scanner for scanning prior to (or concurrently with) with the performing of the unitary user input event at the control panel 35. In some specific practical implementations, the finger print scanner may be an integral component of the user operable actuator 32 used to perform the unitary user input at the control panel 35. For example, in specific implementations in which the user operable actuator 32 (shown in FIG. 2) is in the form of a tactile zone, push-button or other manually operable actuator, the finger print scanner may be integrated within such devices. In such an implementation, when a user performs the unitary user input event contemplated (for example performing a push-button like action, touching or pressing the actuator with one or more fingers), a finger print scan function may be concurrently performed at the control panel 35 in order to obtain user identification information, which may then be used as a criterion in the selection of an ambience setting in the bathing unit system.

Other examples of implementations will become apparent to the reader in view of the teachings of the present description and as such, will not be further described here.

Returning to FIG. 5, as a result of step 502, a specific ambience setting has been selected from the one or more ambience settings stored in memory device 208. In some examples, the specific ambience setting may be characterized by a first operational setting for at least one bathing unit component of a first type and a second operational setting for at least one bathing unit component of a second type. It will however be appreciated that the specific ambience setting may be characterized by any number of operational setting for any number of bathing unit components of one or more different types.

Following step 502, the system may proceed to step 504 and, optionally, may proceed to step 520.

Figure 7:
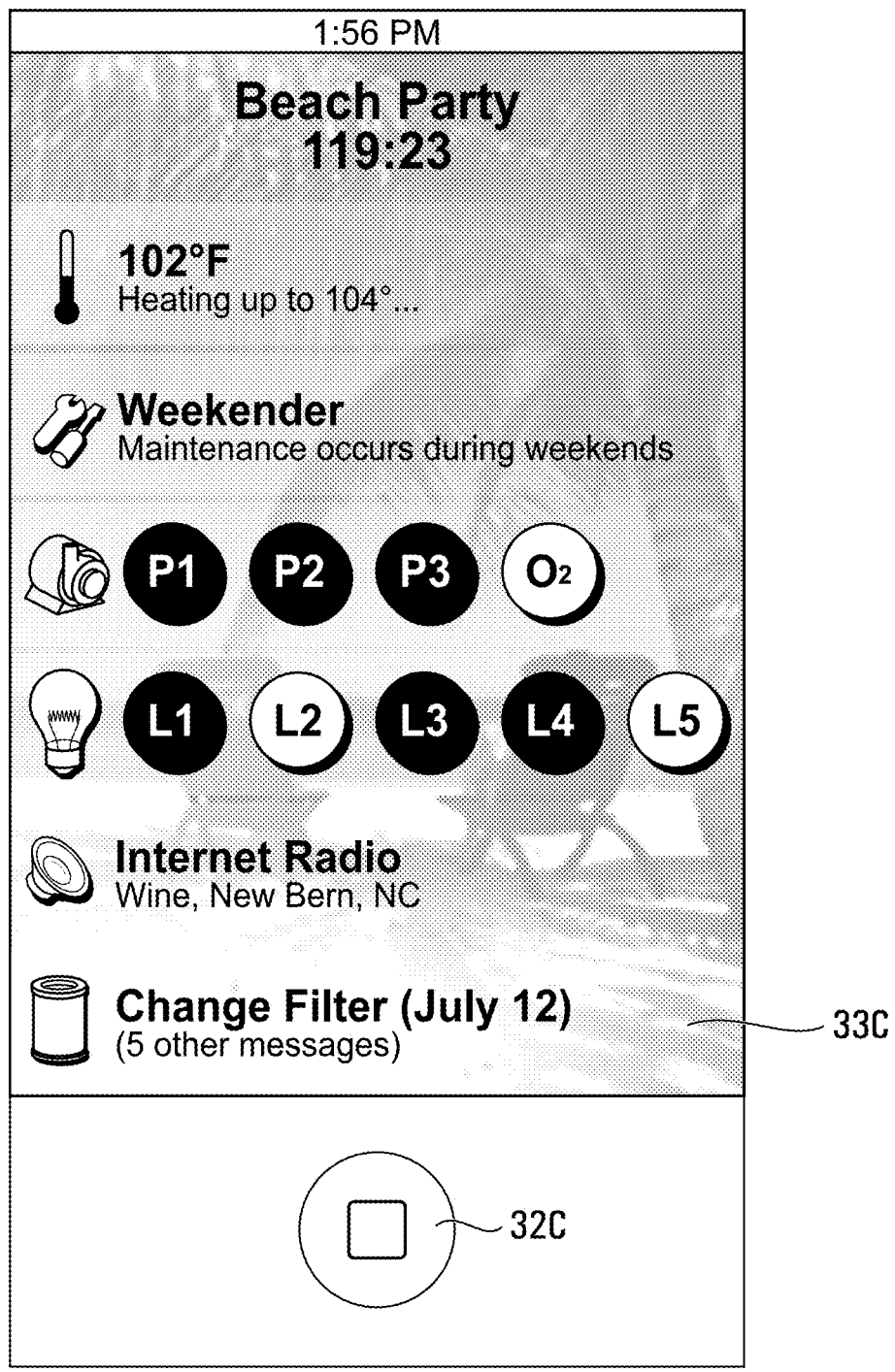
FIG. 7 shows an example of a graphical user interface that may be displayed on the user interface module of the control panel of FIG. 2 following the processing of a unitary input event performed by a user at the control panel in according with a non-limiting example of implementation of the invention.

At step 520, which is an optional step, the processing unit 210 (shown in FIG. 2) may be further programmed for causing the display 33 to display information in response to the unitary user tactile input event performed by the user, the displayed information conveying the specific ambiance setting selected at step 502. FIG. 7 shows an example of a graphical user interface that may be displayed by the user interface module 200 of the control panel 35 of FIG. 2 following the processing of a unitary input event performed by a user at the control panel 35. As shown, the user interface module include a display 33C, analogous to display 33 shown in FIG. 2, and a user operable actuator 32C, analogous to user operable operator 32 shown in FIG. 2. The display 33C conveys operational settings associated to various components in the bathing unit system. In the example shown, the display 33C conveys a water temperature, the status of the different pumps and lights, information pertaining to settings of a radio as well maintenance messages. It is to be appreciated the type of information displayed and the manner in which it is displayed may differ in different implementations. It is to be appreciated that step 520 may be omitted in some embodiments.

At step 504, the processing unit 210 generates a control signal conveying an ambiance activation command associated with the specific ambience setting selected a step 502. The nature of the ambiance activation command may vary in different implementations. For example, in some implementations, the ambiance activation command may convey the specific operational settings associated to one or more bathing unit components in the bathing unit system 100 characterizing the specific ambience setting. In some other implementations, specific operational settings associated to one or more bathing unit components in the bathing unit system 100 characterizing the specific ambience setting may be stored in the controller 34, the ambiance activation command may convey information identifying the specific ambience setting.

At step 506, the control signal conveying the ambiance activation command generated at step 504 is transmitted from the control panel 24 to the controller 34 over communication link 88 (shown in FIG. 1).

At step 508, performed at the controller 34 (shown in FIG. 1), the control signal conveying the ambiance activation command associated with a specific ambience setting sent from the control panel 24 is processed in order to cause the bathing unit system to transition from operating in according with a first operational mode to operating in according with the specific ambience setting. For example, in a case where the specific ambience setting is characterized by a first operational setting for at least one bathing unit component of first type and a second operational setting for at least one bathing unit component of a second type, the controller 34 is configured for operating a corresponding one of the at least one bathing unit component of the first type according to the first operational setting and for operating a corresponding one of the at least one bathing unit component of the second type according to the second operational setting.

The manner in which the controller 34 causes the bathing unit system to transition from operating in according with the first operational mode to operating in according with the specific ambience setting based on the ambiance activation command may be implemented in any suitable manner and will become readily apparent to the person skilled in the art in light of the present description.

Practical Examples of Implementation of the Control Panel 35

Figure 3:
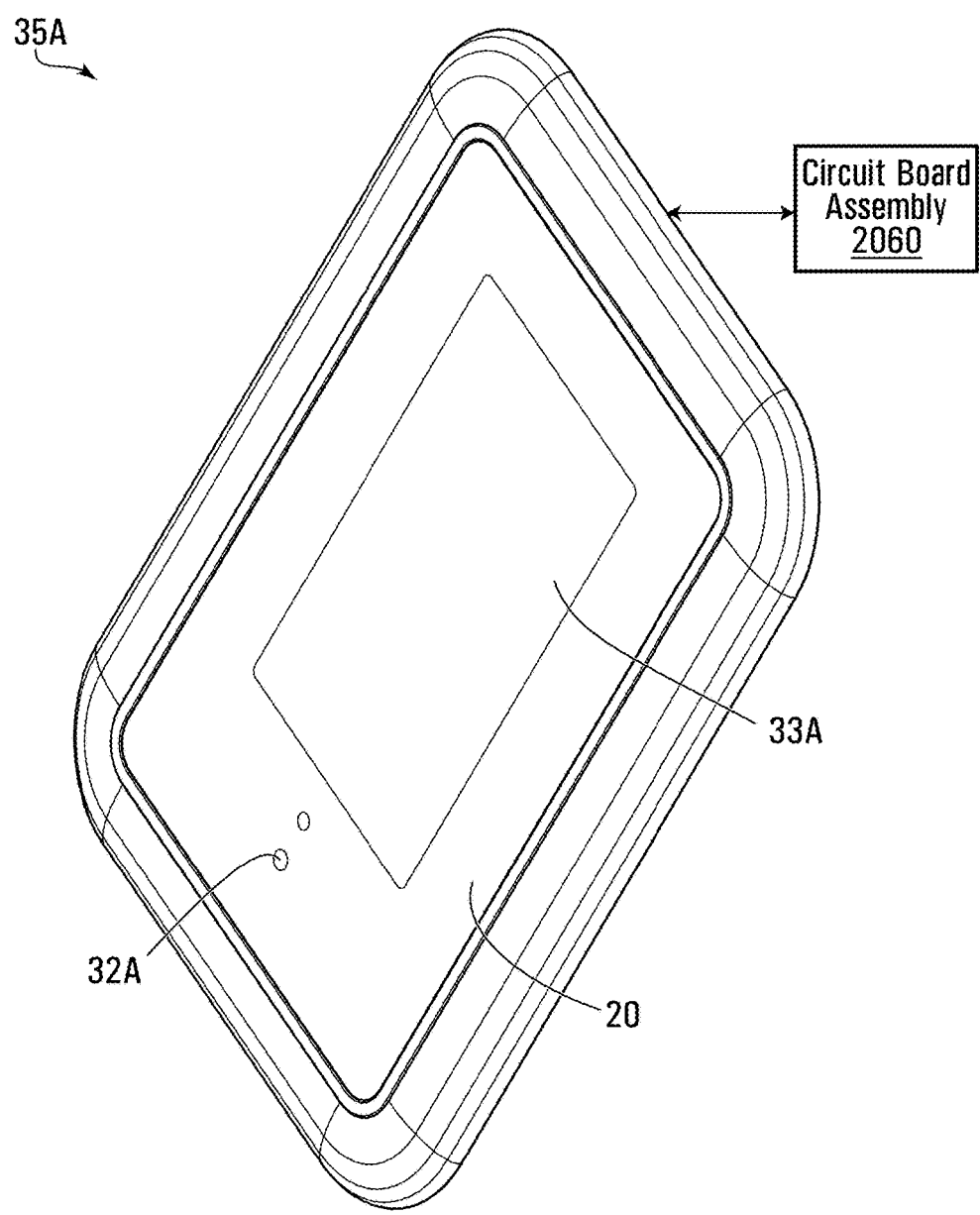
FIG. 3 is a diagram of the control panel of FIG. 2 showing a first specific example of implementation of the user interface module.

As will be appreciated, the control panel 35 described with reference to FIG. 2, may be embodied in many different manners in practice. Two specific examples of implementation will now be described with reference to FIGS. 3 and 4. It is to be understood that these example are merely presented to illustrate manners in which some of the concepts described above may be implemented in practical embodiments. Other embodiments will become apparent to the person skilled in the art in light of the present description FIG. 3 shows a specific implementation of a control panel 35A, analogous to the control panel 35 shown in FIG. 2. The control panel 35A is in the form of a topside control panel and includes a housing upon which is positioned a display touch or presence-sensitive assembly 20, the touch or presence-sensitive assembly 20 including one or more tactile zones for associating user tactile input to software-implemented actions. The touch or presence-sensitive assembly 20 may be in the form of an LCD/touch screen display device. The control panel 35A also includes a circuit board assembly 2060 positioned in the housing beneath the touch or presence-sensitive assembly 20 and electrically coupled thereto. The circuit board assembly 2060 includes a memory device, analogous to memory device 208 (shown in FIG. 2) and a processing unit, analogous to processing unit 210 (also shown in FIG. 2). The memory device may store data conveying a set of ambience settings and program instructions for allowing the control panel 35A to implement various functions.

In the embodiment shown, the display touch or presence-sensitive assembly 20 includes a touch sensitive display screen portion 33A, analogous to display 33 (shown in FIG. 2), and a user operable actuator in the form of a tactile zone 32A, analogous to user operable actuator 32 (shown in FIG. 2). The touch sensitive display screen portion 33A may provide another tactile zone on the control panel. In a practical implementation, the touch sensitive display screen portion 33A may use capacitive sensor technology, in which case it can sense changes in capacitance at areas of the display screen portion 33A caused by nearness of a user's finger or other object (such as a stylus) to the touch sensitive layer. The topside control panel 35A may therefore be touch or presence-sensitive to the user's finger or other device such as a stylus. The sensitivity of the display screen portion 33A may typically be adjusted, e.g., through software driver adjustment, so that the user may not need to even physically touch the cover layer to actuate a button or some other activity such as a swipe. The touch sensitive display screen portion 33A is responsive to changes in capacitance resulting from touching or close proximity of an object to the touch or presence-sensitive layer to generate and transmit signals to the processor in the circuit board assembly 2060. In a practical implementation, the LCD/touch screen display assembly 33A is a TFT LCD (thin film transistor liquid crystal display) module. Displays employing other known technologies may be used in alternate implementations and thus need not be described in greater detail here.

In specific practical implementations, the tactile zone 32A may provide haptic feedback when operated by a user in a push-button like action. The tactile zone 32A may in some cases include a mechanical actuator positioned below the display touch or presence-sensitive assembly 20 which may be actuated when operated by a user in a push-button like action. Many other variants for implementing the tactile zone 32A are possible and will become apparent to the person skilled in the art in view of the present description.

In the embodiment depicted in FIG. 3, actuation of the tactile zone 32A, for example when operated by a user in a push-button like action, causes a signal to be transmitted to the processor of the circuit board assembly 2060 where it is processed in accordance with the program instructions stored in a memory device.

In a specific implementation, the effect of the signal transmitted to the processor of the circuit board assembly 2060 when the user operable actuator 32A is operated by a user in a push-button like action may depend upon the operational mode in accordance to which the bathing unit system 100 is currently operating and/or on the information displayed on the display 33A.

In a first specific practical implementation, take a situation in which the bathing unit system 100 is currently operating according to a rest mode, wherein the rest mode is a mode in which the bathing unit system is unlikely to be in use by a bather. For example, in a rest mode, bathing unit components involved in water circulation, filtering and heating may be operated but jets, lights, entertainment and other such components may be deactivated. When the bathing unit system 100 is currently operating according to a rest mode, the program instructions stored in the memory device may cause the processor of the circuit board assembly 2060 to process the signal transmitted by the unitary user tactile input event performed by the user (e.g. operating the user operable actuator 32A in a push-button like action) to select a specific ambience setting from a set of ambience settings stored in a memory device based upon one or more criteria (for example in a manner analogous to what is described with reference to step 502 of FIG. 5) and to generate a control signal conveying an ambiance activation command associated with the specific ambience setting. The control signal may then be transmitted to the controller 34.

In this manner, the bathing unit system can be caused to transition between operating in accordance with a first operational mode (in this example a rest mode), to operating in accordance with a second operational mode (in this example according to the specific ambience setting), through the user performing a unitary user tactile input event (in this example operating the user operable actuator 32A in a push-button like action). It is to be appreciated that in this embodiment, the display 33A does not need to display any selectable options to the user at the time the unitary user tactile input event is performed and may in some cases be "OFF" when the user performs the unitary user tactile input event.

Optionally, in some embodiments, the program instructions stored in the memory device may cause the processor of the circuit board assembly 2060 to generate a display signal for causing the touch sensitive display screen portion 33A to display information conveying the specific ambiance setting selected in response to the unitary user input event performed by the user.

As mentioned above, the effect of the signal transmitted to the processor of the circuit board assembly 2060 when the user operable actuator 32A is operated by a user in a push-button like action may depend upon the information displayed on the display 33A when the user operates the user operable actuator 32A in a push-button like action so that the generation of a control signal conveying the ambiance activation command associated with the specific ambience setting is only performed by the processor of the circuit board assembly 2060 is certain specific cases. In a non-limiting implementation, generation of a control signal conveying the ambiance activation command associated with the specific ambience setting may only performed when the display is off or when the display is in a rest mode. The person skilled in the art will readily appreciate that such functionality may be implemented in many different ways by providing a suitably programmed processor in the circuit board assembly 2060.

Figure 4:
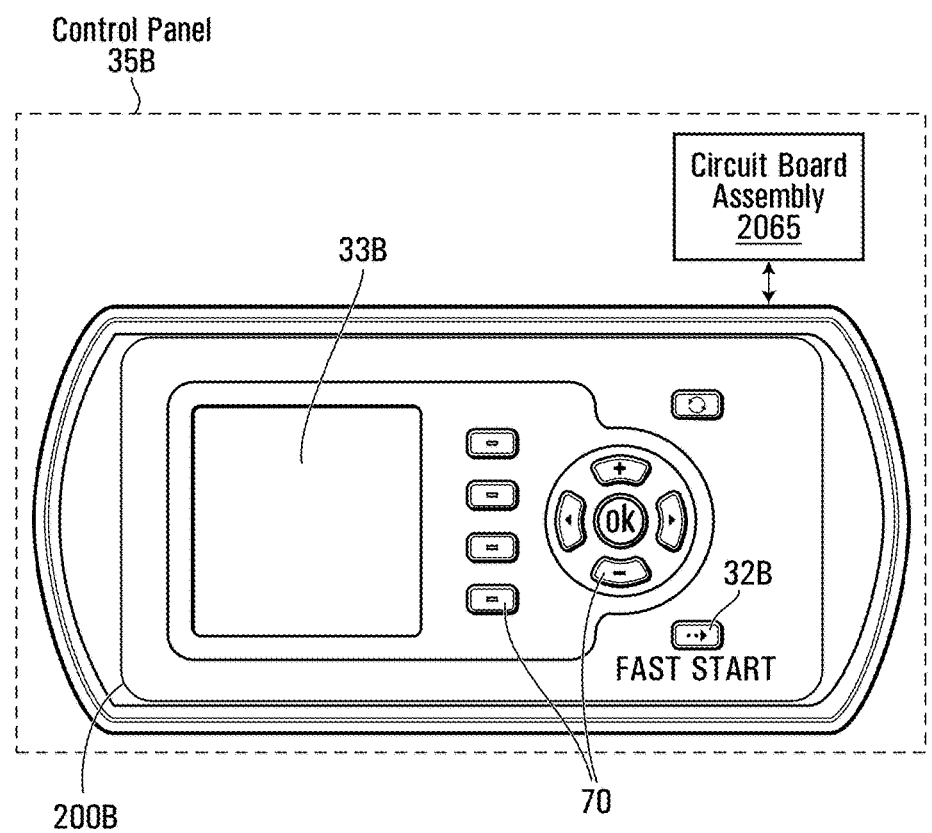
FIG. 4 is a diagram of the control panel of FIG. 2 showing a second specific example of implementation of the user interface module.

FIG. 4 shows a second specific implementation of a control panel 35B, analogous to the control panel 35 shown in FIG. 2. The control panel 35B is in the form of a topside control panel and includes a housing upon which is positioned a user interface module 200B, analogous to user interface module 200 (shown in FIG. 2). The user interface module 200B includes a display screen 33B, analogous to display 33 (shown in FIG. 2) and one or more of the user input devices 70 32B, analogous to the user input devices 38 (shown in FIG. 2).

The control panel 35B also includes a circuit board assembly 2065 positioned in the housing beneath the user interface module 200B and electrically coupled thereto. The circuit board assembly 2065 includes a memory device, analogous to memory device 208 and a processing unit, analogous to processing unit 210. The memory device may store a set of ambience settings and program instructions for allowing the control panel 35B to implement various functions of the type described with reference to FIG. 2.

The one or more of the user input devices 70 32B include a set of push-buttons 70 configured for allowing a user to navigate through a menu driven interface generated by the processing unit of the circuit board assembly 2065 and displayed on the display screen 33B. In the example shown, each of the push-buttons in the set 70 may be actuated by a user by performing a push-button like action. The menu driven interface may be implemented in accordance with any suitable method known in the art.

The one or more of the user input devices 70 32B also includes a user operable actuator 32B, analogous to user operable actuator 32 shown in FIG. 2. In the example depicted user operable actuator 32B is in form of a mechanical actuator, specifically a push-button, which may be actuated by a user by performing a push-button like action. Many other variants for implementing user input devices 70 32B are possible and will become apparent to the person skilled in the art in view of the present description.

In the embodiment depicted in FIG. 4, actuation of the user operable actuator 32B, for example when operated by a user in a push-button like action, causes a signal to be transmitted to the processor of the circuit board assembly 2065 where it is processed in accordance with the program instructions stored in a memory device.

In a specific implementation, the effect of the signal transmitted to the processor of the circuit board assembly 2065 when the user operable actuator 32B is operated by a user in a push-button like action may be independent from the operational mode in accordance to which the bathing unit system 100 is currently operating and/or may be independent from the information displayed on the display 33B.

In a first specific practical implementation, take a situation in which the bathing unit system 100 is currently operating according to a rest mode, wherein the rest mode is a mode in which the bathing unit system is unlikely to be in use by a bather. When the bathing unit system 100 is currently operating according to the rest mode, the program instructions stored in the memory device may cause the processor of the circuit board assembly 2065 to process the signal transmitted by the unitary user tactile input event performed by the user (e.g. operating the user operable actuator 32B in a push-button like action) to select a specific ambience setting from a set of ambience settings stored in a memory device based upon one or more criteria (for example in a manner analogous to what is described with reference to step 502 of FIG. 5) and to generate a control signal conveying an ambiance activation command associated with the specific ambience setting. The control signal would then be transmitted to the controller 34.

In this manner, the bathing unit system can be caused to transition between operating in accordance with a first operational mode (in this example a rest mode), to operating in accordance with a second operational mode (in this example according to the specific ambience setting), through the user performing a unitary user tactile input event (in this example operating the user operable actuator 32B in a push-button like action). As such, the need for the user to navigate using the keys 70 through a menu driven interface that would be displayed on the display 33B in order to operate in accordance with a specific ambience setting may be by-passed by a unitary user tactile input event (in this example operating the user operable actuator 32B in a push-button like action). It is to be appreciated that in this embodiment, the display 33B does not need to display any selectable options to the user and may in some cases be "OFF" when the user performs the unitary user tactile input event.

Optionally, in some embodiments, the program instructions stored in the memory device may cause the processor of the circuit board assembly 2065 to generate a display signal for causing the display screen portion 33B to display information conveying the specific ambiance setting selected in response to the unitary user input event performed by the user.

In a second specific practical implementation, take a situation in which the bathing unit system 100 is currently operating according to a first specific ambience setting. When the bathing unit system 100 is currently operating according to a first specific ambience setting, the program instructions stored in the memory device may cause the processor of the circuit board assembly 2065 to process the signal transmitted by the unitary user tactile input event performed by the user (e.g. operating the user operable actuator 32B in a push-button like action) to select a second specific ambience setting from a set of ambience settings stored in a memory device (for example in a manner analogous to what is described with reference to step 502 of FIG. 5) and to generate a control signal conveying an ambiance activation command associated with the second specific ambience setting. The control signal is then be transmitted to the controller 34.

In this manner, the bathing unit system can be caused to transition between operating in accordance with a first operational mode (in this example a first specific ambience setting), to operating in accordance with a second operational mode (in this example according to the second specific ambience setting), through the user performing a unitary user tactile input event (in this example operating the user operable actuator 32B in a push-button like action). It is to be appreciated that in this embodiment, the display 33B does not need to display any selectable options to the user and may in some cases be "OFF" when the user performs the unitary user tactile input event. This embodiment would allow a bathing unit system in which settings were altered by the user through the user input devices 70 to revert to a desired specific ambience setting (for example to revert to a default ambience setting) through the user simply performing a unitary user tactile input event (in this example operating the user operable actuator 32B in a push-button like action). As such, the need for the user to navigate using the keys 70 through a menu driven interface that would be displayed on the display 33B in order to revert to a desired specific ambience setting may be by-passed by a unitary user tactile input event (in this example operating the user operable actuator 32B in a push-button like action).

Although the user operable actuator 32B shown in FIG. 4 is in the form of a push-button, it should be appreciated that any other type, or combination, of user input devices known in the art may be used, including without being limited to a pointing device, trackball, mouse, remote gyroscope (which senses movement of the device in the air so as to move a cursor), a keypad, a touch sensitive screen, turn-dials, turn-and-push dials, a stylus pen or a microphone, among other possibilities.

In alternate embodiments, not shown in the Figures, the display 33 may be omitted and the control panel 35 may instead comprise a user operable actuator 32 alone or with one or more other components such as a speaker or a set of lights, which could serve to provide audio or light feedback to the user in response to actuation of the user operable actuator 32.

Installation in a Bathing Unit System

As mentioned above, the process and control panel 35 described above are for use in connection with bathing unit systems in order to facilitate the control of such systems. Such bathing unit systems can include spas having spa tubs, although it will be appreciated that the subject matter may be practiced in connection with other bathing unit systems, such as whirlpool baths and pools.

In a typical installation, the control panel 35 (including the embodiments 35A and 35B depicted in FIGS. 3 and 4 for example), may be mounted to a surface of a bathing unit system.

A specific example of such an installation on a bathing unit system 100', analogous to bathing unit system 100 shown in FIG. 1, is depicted in FIG. 8 of the drawings.

As shown, the bathing unit system 100' includes a receptacle 180' (analogous to receptacle 180 shown in FIG. 1) for holding water, the receptacle having a peripheral wall 132A upon which a control panel 35', analogous to control panel 35, is positioned. While not shown, the bathing unit system 100' of FIG. 8 also includes a plurality of bathing unit components including at least a circulation pump and a heater. The bathing unit system 100' also includes a controller (not shown), of the type described with reference to controller 34 shown in FIG. 1, in communication with the control panel 35' for controlling operational settings associated with the bathing unit components in accordance with the principles described earlier in the present document.

In this exemplary practical implementation, the control panel 35' is a topside control panel and is positioned on an upper portion of peripheral wall 132A of the receptacle 180'.

In typical installations, the peripheral wall 132A of the receptacle 180' may be fabricated in part using a moldable material, such as fiberglass or other materials, including metal and ceramic materials for example. In a practical implementation, the topside control panel 35' may be installed is a pre-made mount opening formed on the peripheral wall 132A or by drilling or otherwise forming such an opening in the bathing unit receptacle peripheral wall. The topside control panel 35' is the installed so that wiring is passed through the mount opening to that it can be suitably connected to the controller. The topside control panel may further be secured in place upon the peripheral wall 132A using any suitable mounting fasteners and/or adhesives and/or mounting gaskets.

While the control panel 35' has been shown as mounted to a peripheral wall 132A of the receptacle 180', it will however be apparent to the person skilled in the art that the control panel 35' may be mounted in other suitable locations on the receptacle 180', including for example along the spa skirt 550.

Moreover, while the control panel 35' has been shown as being mounted directed to a surface of the receptacle 180', it is to be appreciated that it may be mounted on a suitable structure that is located remotely from the receptacle 180', such as for example on a wall of an outdoor structure, on an inside/outside wall of a house, integrated in a free standing structure that can be positioned in general proximity to the bathing unit receptacle or on any other suitable structure.

The person skill in the art will appreciated that many variations to the embodiments described in the present document art possible and will become apparent from a reading of the present document concurrently with the figures.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

Although various embodiments of the invention have been described and illustrated, it will be apparent to those skilled in the art in light of the present description that numerous modifications and variations can be made. The scope of the invention is defined more particularly in the appended claims.

The invention claimed is:

1. A method for causing a bathing unit system to transition from being in a rest mode to operating in accordance with an ambience setting, the bathing system including a set of bathing unit components, a controller for operating the set of bathing unit components and a control panel in communication with the controller, said method comprising:
   a) providing a user operable actuator for generating a control signal in response to a unitary user input event performed by a user at the control panel, the control signal conveying an ambiance activation command associated with a specific ambience setting, the generation of the control signal comprising selecting the specific ambience setting from a set of ambience settings stored in a memory device, wherein the unitary user input event performed at the control panel is an actuation of the user operable actuator by the user and wherein selecting the specific ambience setting from the set of ambience settings stored in the memory device is performed based on criteria independent from information provided by the user through the actuation of the user operable actuator;
   b) transmitting the control signal conveying the ambiance activation command from the control panel to the controller over a communication link;
   c) at the controller, processing the control signal conveying the ambiance activation command received from the control panel to cause the bathing unit system to transition from being in the rest mode to operating in accordance with the specific ambience setting.

2. A method as defined in claim 1, wherein the set of ambience settings includes two or more ambience settings.

3. A method as defined in claim 1, wherein the control panel includes the user operable actuator.

4. A method as defined in claim 3, wherein the actuation of the user operable actuator is a manual actuation of the user operable actuator.

5. A method as defined claim 1, wherein said method comprises providing a menu driven interface on the control panel for allowing the user to provide user selection information to control operational settings of the bathing unit system by navigating through the menu driven interface, said user operable actuator being operable by the user to perform the unitary user input event absent navigation through the menu driven interface provided on the control panel.

6. A method as defined in claim 1, wherein the specific ambience setting selected from the set of ambience settings corresponds to an ambience setting in the set of ambience settings most recently used to operate the bathing unit system.

7. A method as defined in claim 1, wherein the specific ambience setting selected from the set of ambience settings corresponds to a default ambience setting.

8. A method as defined in claim 1, wherein at least some ambience settings in the set of ambience settings are associated to respective time periods and wherein said method comprises processing information associated with current timing information to select the specific ambience setting from the set of set of ambience settings stored in the memory device at least in part based on the current timing information.

9. A method as defined in claim 8, wherein the information associated with current timing information conveys one or more of weekday information, period of day information, hours and minutes.

10. A method as defined in claim 1, wherein one or more ambience settings in the set of ambience settings are associated with user identifiers.

11. A method as defined in claim 1, wherein said method comprises receiving user identification information and selecting the specific ambience setting from the set of ambience settings stored in the memory device at least in part by processing the user identification information.

12. A method as defined claim 11, wherein the user identification information is received at the control panel over a wireless communication link.

13. A method as defined claim 11, wherein the user identification information is received at the control panel from the controller of the bathing unit system.

14. A method as defined claim 3, wherein the control panel includes a display screen and wherein said method further comprises causing the display screen to display information in response to the unitary user input event performed by the user at the control panel, the displayed information conveying the specific ambience setting selected.

15. A method as defined in claim 1, wherein the specific ambience setting is characterized by at least:
   a) a first operational setting for at least one bathing unit component of first type; and b) a second operational setting for at least one bathing unit component of a second type.

16. A method as defined in claim 15, wherein the bathing unit system is caused to transition from being in the rest mode to operating in accordance with the specific ambience setting at least in part by:
   a) the controller operating a corresponding one of the at least one bathing unit component the first type of according to the first operational setting; and
   b) the controller operating a corresponding one of the at least one bathing unit component the second type of according to the second operational setting.

17. A method for causing a bathing unit system to transition from being in a first operational mode to operating in accordance with an ambience setting, the bathing system including a set of bathing unit components, a controller for operating the set of bathing unit components and a control panel in communication with the controller, the control panel displaying a graphical user interface, said method comprising:
   a) providing a user operable actuator on the graphical user interface for generating a control signal in response to a unitary user input event performed by a user through the graphical user interface, the control signal conveying an ambiance activation command associated with a specific ambience setting, the generation of the control signal comprising selecting the specific ambience setting from a set of ambience settings stored in a memory device, wherein the unitary user input event is an actuation of the user operable actuator by the user and wherein selecting the specific ambience setting from the set of ambience settings stored in the memory device is performed based on criteria independent from information provided by the user through the actuation of the user operable actuator;
   b) transmitting the control signal conveying the ambiance activation command from the control panel to the controller over a communication link;
   c) at the controller, processing the control signal conveying the ambiance activation command received from the control panel to cause the bathing unit system to transition from being in the first operational mode to operating in accordance with the specific ambience setting.

18. A method as defined in claim 17, wherein the first operational mode is a rest mode.

19. A method as defined in claim 17, wherein the first operational mode is an ambience setting distinct from said specific ambience setting.

20. A method as defined in claim 19, wherein the set of ambience settings includes two or more ambience settings.

21. A method as defined in claim 19, wherein the actuation of the user operable actuator is a manual actuation of the user operable actuator.

22. A method as defined claim 19, wherein the graphical user interface implements a menu driven interface for allowing the user to provide user selection information to control operational settings of the bathing unit system by navigating through the menu driven interface, said user operable actuator being operable by the user to perform the unitary user input event absent navigation through the menu driven interface provided by the graphical user interface.

23. A method as defined in claim 19, wherein the specific ambience setting selected from the set of ambience settings corresponds to an ambience setting in the set of ambience settings most recently used to operate the bathing unit system.

24. A method as defined in claim 19, wherein the specific ambience setting selected from the set of ambience settings corresponds to a default ambience setting.

25. A method as defined in claim 19, wherein at least some ambience settings in the set of ambience settings are associated to respective time periods and wherein said method comprises processing information associated with current timing information to select the specific ambience setting from the set of set of ambience settings stored in the memory device at least in part based on the current timing information.

26. A method as defined in claim 25, wherein the information associated with current timing information conveys one or more of weekday information, period of day information, hours and minutes.

27. A method as defined in claim 19, wherein one or more ambience settings in the set of ambience settings are associated with user identifiers.

28. A method as defined in claim 19, wherein said method comprises receiving user identification information and selecting the specific ambience setting from the set of ambience settings stored in the memory device at least in part by processing the user identification information.

29. A method as defined claim 19, wherein the user identification information is received at the control panel over a wireless communication link.

30. A method as defined claim 29, wherein the user identification information is received at the control panel from the controller of the bathing unit system.

31. A method as defined claim 30, wherein said method further comprises causing the graphical user interface to display information in response to the unitary user input event performed by the user, the displayed information conveying the specific ambience setting selected.

32. A method as defined in claim 19, wherein the specific ambience setting is characterized by at least:
   a) a first operational setting for at least one bathing unit component of first type; and
   b) a second operational setting for at least one bathing unit component of a second type.

33. A method as defined in claim 32, wherein the bathing unit system is caused to transition from being in the rest mode to operating in accordance with the specific ambience setting at least in part by:
   a) the controller operating a corresponding one of the at least one bathing unit component the first type of according to the first operational setting; and
   b) the controller operating a corresponding one of the at least one bathing unit component the second type of according to the second operational setting.

* * * * *